US012467865B2

United States Patent
Ting et al.

(10) Patent No.: US 12,467,865 B2
(45) Date of Patent: Nov. 11, 2025

(54) OPTICAL ANALYSIS SYSTEM AND OPTICAL ANALYZER THEREOF

(71) Applicant: Dalian Mega Crystal Biological Technology Co., Ltd., Dalian (CN)

(72) Inventors: Yi-sheng Ting, New Taipei (TW); Yu-tsung Chen, New Taipei (TW)

(73) Assignee: Dalian Mega Crystal Biological Technology Co., Ltd., Dalian (CN)

( * ) Notice: Subject to any disclaimer, the term of this patent is extended or adjusted under 35 U.S.C. 154(b) by 82 days.

(21) Appl. No.: 18/711,097

(22) PCT Filed: Nov. 18, 2022

(86) PCT No.: PCT/IB2022/061126
§ 371 (c)(1),
(2) Date: May 16, 2024

(87) PCT Pub. No.: WO2023/089545
PCT Pub. Date: May 25, 2023

(65) Prior Publication Data
US 2025/0012720 A1    Jan. 9, 2025

(30) Foreign Application Priority Data

Nov. 18, 2021 (TW) .................................. 110143041
Nov. 10, 2022 (TW) .................................. 111143042

(51) Int. Cl.
G01N 21/59          (2006.01)
(52) U.S. Cl.
CPC ..... *G01N 21/59* (2013.01); *G01N 2201/0612* (2013.01); *G01N 2201/065* (2013.01);
(Continued)

(58) Field of Classification Search
CPC ........... G01N 21/59; G01N 2201/0612; G01N 2201/065; G01N 2201/0664;
(Continued)

(56) References Cited

U.S. PATENT DOCUMENTS

| 5,870,926 A | 2/1999 | Saito |
| 9,877,368 B2 | 1/2018 | Nagai |
| 2010/0252737 A1 | 10/2010 | Fournel |

FOREIGN PATENT DOCUMENTS

| CN | 102656441 A | 9/2012 |
| CN | 104374747 A | 2/2015 |

(Continued)

OTHER PUBLICATIONS

"International Search Report" mailed on Mar. 2, 2023 for International application No. PCT/IB2022/061126, International Filing Date: Nov. 18, 2022.

*Primary Examiner* — Md M Rahman
(74) *Attorney, Agent, or Firm* — Winston Hsu

(57) ABSTRACT

An optical analysis system and an optical analyzer thereof. The optical analyzer comprises a solid state light source emitter, a uniform mixing or light splitting assembly, a first optical receiver, and a second optical receiver. The solid state light source emitter comprises a light source comprising multiple light-emitting assemblies respectively radiating light having at least one light-emitting peak wavelength and at least one wavelength range; the light emitted by the multiple light-emitting assemblies passes through the uniformly mixing or light splitting assembly to form first light and second light which passes through a fluidic object to be detected to form detection light (i.e., after the second light passes through the fluidic object to be detected, the part of the second light not absorbed by the fluidic object to be detected forms detection light. The first optical receiver (Continued)

receives the first light. The second optical receiver receives the detection light.

22 Claims, 15 Drawing Sheets

(52) U.S. Cl.
CPC ............... *G01N 2201/0664* (2013.01); *G01N 2201/0694* (2013.01)

(58) Field of Classification Search
CPC ......... G01N 2201/0694; G01N 21/255; G01N 2201/062; G01J 1/02; H01L 25/13
USPC ........................................................ 356/432
See application file for complete search history.

(56) References Cited

FOREIGN PATENT DOCUMENTS

| | | |
|---|---|---|
| CN | 111458107 A | 7/2020 |
| CN | 111987079 A | 11/2020 |
| CN | 112525854 A | 3/2021 |
| CN | 112834436 A | 5/2021 |
| CN | 113933268 A | 1/2022 |
| CN | 114910444 A | 8/2022 |
| JP | 2013-137265 A | 7/2013 |
| JP | 2016-145770 A | 8/2016 |
| TW | 202113313 A | 4/2021 |
| TW | 202201717 A | 1/2022 |
| WO | 2017/029791 A1 | 2/2017 |

OPTICAL ANALYSIS SYSTEM AND OPTICAL ANALYZER THEREOF

BACKGROUND OF THE INVENTION

1. Field of the Invention

The present invention relates to the technical field of transmissive optical analysis, and in particular to an optical analysis system and an optical analyzer thereof which use two optical receivers to respectively receive the light rays from a light source to determine whether the emission intensity of the light source attenuates.

2. Description of the Prior Art

Current optical analyzers may be divided into single-beam spectrometers and double-beam spectrometers. In the single-beam spectrometer, the detection principle is to make the light source emit two detection rays and respectively pass through the corresponding monochromator before the two detection light rays are adjusted by the spinning of a beam splitter to respectively pass through a liquid-to-be-measured in an absorption cell. The liquid-to-be-measured absorbs the detection light rays of different wavelengths due to its different compositions. After the detection light rays which passed through the absorption cell are received by the detector to obtain the absorption spectrum of the liquid-to-be-measured to detect the physical or chemical properties of the liquid-to-be-measured. However, the single-beam spectrometer switches the detection light rays of different frequencies merely by the spinning of the mirror of the beam splitter. When the spinning of the mirror is slow and the wavelengths cannot be quickly switched, a complete absorption spectrum cannot be measured in real time if the object-to-be-measured is a fluid which flows fast. Furthermore, both the two detection light rays pass through the absorption cell before received by the detectors. Therefore, it is unable to monitor the light intensity of the original detection light rays, so it is difficult to know in real time whether the intensity of the light source attenuates.

In the double-beam spectrometer, as shown in FIG. 1, the detection principle is to use the light rays which are emitted by the light source to pass through a light splitter R1 which splits the light path into a detection light path P1 and a comparison light path P2. In the detection light path P1, the light ray passes through the liquid-to-be-measured in the absorption cell 3. The liquid-to-be-measured absorbs the light rays of different wavelengths due to its different components. The light ray passing through the absorption cell 3 is received by the first detector 4 to obtain the absorption spectrum of the liquid-to-be-measured. In the contrast light path P2, the light can be directly received by the second detector 5 to form a contrast spectrum. Finally, the physical or chemical properties of the liquid-to-be-measured are detected by the comparison and analysis of the above-mentioned absorption spectrum and the contrast spectrum. However, if multiple mirrors are used, as shown in FIG. 1, a beam splitter R2 is added to change the direction of the contrast light path P2. The current optical analyzers are larger in size and cannot be made into portable products due to the increase in number of mirrors in addition to the sealing of the mirrors to prevent dust. In addition, the spectrum cannot be formed if the light absorption of the liquid-to-be-measured is large when the light intensity is too low after the light is split by the beam-splitter R1. On the other hand, the changes in light intensity are affected if the angle of the beam-splitter R1 changes.

Therefore, the present invention explains how to effectively improve the above-mentioned problems of current single-beam spectrometers and double-beam spectrometers which developers and researchers in related industries are working on to overcome them by means of innovative hardware design.

SUMMARY OF THE INVENTION

In the light of these, the objective of the present invention is to provide an optical analysis system and an optical analyzer thereof, which have a plurality of light-emitting components which can sequentially emit light rays of different wavelength ranges and compares the differences between light rays which are received by two optical receivers by setting two optical receivers to determine whether the light intensity of the light rays which are emitted by the light-emitting components is attenuated.

The optical analyzer in the embodiments of the present invention includes a solid-state light source emitter, a uniformly mixing or light-splitting component, a first optical receiver and a second optical receiver. The solid-state light source emitter includes a light source. The light source includes a plurality of light-emitting components which emit a light ray with at least one peak emission wavelength and at least one wavelength range. A plurality of the light-emitting components are light-emitting diodes, vertical-cavity surface-emitting lasers or laser diodes, and a plurality of the light-emitting components can respectively exhibit discontinuous illumination emission of on-off frequencies. A plurality of the on-off frequencies are the same as each other or different from each other, or a plurality of the on-off frequencies are partially the same or partially different. The light rays which are emitted by a plurality of the light-emitting components form a first light ray and a second light ray after passing through the uniformly mixing or light-splitting component. A detection light ray is obtained when the second light ray passes through the fluid-to-be-measured and is not absorbed by the fluid-to-be-measured. The first optical receiver receives the first light ray. The second optical receiver receives the detection light ray.

In another embodiment, when the first light ray has a standard light intensity, a light intensity of the second light ray has a specific ratio to the standard light intensity, and a ratio of the detection light ray to the standard light intensity is a standard transmittance ratio of the fluid-to-be measured; and when the first light ray has a working light intensity, the light intensity of the second light ray and the working light intensity shows the specific ratio, and a ratio of the detection light ray to the working light intensity is a working transmittance ratio of the fluid-to-be measured, and the standard light intensity and the working light intensity are different. The comparison result between the standard transmittance ratio and the working transmittance ratio is used to determine a composition change of the fluid-to-be measured.

In another embodiment, when the first light ray has a standard light intensity, the first optical receiver receives the first light ray to generate a standard light intensity signal, and when the first light ray has an attenuated light intensity, the first optical receiver receives the first light ray to generate an attenuated light intensity signal. By the comparison of a change value between the standard light intensity signal and the attenuated light intensity signal, the light splitting component adjusts the light intensity of the first light ray according to the change value.

In another embodiment, the uniformly mixing or light-splitting component is an optical integrating sphere. The optical integrating sphere includes a light entrance, a first light exit and a second light exit. The first optical receiver aligns with the first light exit. The second optical receiver aligns with the second light exit. The light rays emitted by the light-emitting components enter the optical integrating sphere through the light entrance. The first light ray emits through the first light exit. The second light ray emits through the second light exit.

In another embodiment, the first light exit and the light entrance are separated by a center angle of 90 degrees of the circle relative to the center of the optical integrating sphere. The second light exit and the light entrance are separated by a center angle of 90 degrees of the circle relative to the center of the optical integrating sphere. The first light exit and the second light exit are separated by a center angle of 180 degrees of the circle relative to the center of the optical integrating sphere.

In another embodiment, the uniformly mixing or light-splitting component is a shielding plate with a through hole. The first optical receiver is provided at the shielding plate to face a plurality of the light-emitting components. A portion of a plurality of the light rays emitted by a plurality of the light-emitting components becomes the first light ray and received by the first optical receiver. Another portion of a plurality of the light rays emitted by a plurality of the light-emitting components passes through the through hole to become the second light.

In another embodiment, a plurality of the wavelength ranges of the two light-emitting components to which adjacent two of the peak emission wavelengths correspond partially overlap to form a continuous wavelength range which is wider than the wavelength range in each of a plurality of the light-emitting components, or a plurality of the wavelength ranges of the two light-emitting components to which adjacent two of the peak emission wavelengths correspond do not overlap.

In another embodiment, a plurality of the light-emitting components of different wavelength ranges emit light at different times.

In another embodiment, the solid-state light source emitter further includes a substrate to measure a constant current bias when a plurality of the light-emitting components (13) work, and a PN junction temperature of the solid-state light source emitter is obtained by a mathematical relationship formula or a corresponding table or diagram between the constant current bias of a plurality of the light-emitting components and the PN junction temperature of the solid-state light source emitter, then an emission intensity ratio of a plurality of the light-emitting components is obtained by a mathematical relationship formula or a corresponding table or diagram between the light intensity of a plurality of the light-emitting components and the PN junction temperature to correct a light intensity value of a plurality of the light-emitting components measured by the first optical receiver according to a determined result.

In another embodiment, the optical analyzer further includes a first processor and a first display device. The solid-state light source emitter, the first optical receiver and the second optical receiver are connected to the first processor. The first processor controls the solid-state light source emitter to sequentially emit a plurality of the light rays. The light intensity signals received by the first optical receiver and by the second optical receiver are displayed on the first display device.

In another embodiment, the optical analyzer further includes a first wireless communication module connected to the first processor. The light intensity signals received by the optical receiver and by the second optical receiver are able to be transmitted to an external electronic device via the first wireless communication module, or the first wireless communication module 70 receives a control signal from the external electronic device.

In another embodiment, the on-off frequencies are between 0.05 time/second and 50,000 times/second.

In another embodiment, a time interval for turning on the light-emitting component in the on-off frequencies is between 0.00001 second and 10 seconds.

In another embodiment, a time interval for turning off the light-emitting component in the on-off frequencies is between 0.00001 seconds and 10 seconds.

In another embodiment, a difference between adjacent two peak emission wavelengths is between 1 nm and 80 nm.

In another embodiment, a difference between adjacent two peak emission wavelengths is between 5 nm and 80 nm.

In another embodiment, a full width at half maximum which each the peak emission wavelength corresponds to is between 15 nm and 50 nm.

In another embodiment, a full width at half maximum which each the peak emission wavelength corresponds to is between 15 nm and 40 nm.

In another embodiment, a difference between adjacent two peak emission wavelengths is greater than or equal to 0.5 nm.

In another embodiment, a difference between adjacent two peak emission wavelengths is between 1 nm and 80 nm.

In another embodiment, a full width at half maximum which at least a portion of the peak emission wavelength in a plurality of peak emission wavelengths corresponds to is greater than 0 nm and less than or equal to 60 nm.

The optical analyzer according to the embodiment of the present invention includes a solid-state light source emitter, a first optical receiver and a second optical receiver. The solid-state light source emitter includes a light source. The light source includes a plurality of light-emitting components and each one of the light-emitting components emits a light with at least one peak emission wavelength and at least one wavelength range. A plurality of the light-emitting components are light-emitting diodes, vertical-cavity surface-emitting lasers or laser diodes. A plurality of the light-emitting components are able to respectively exhibit discontinuous illumination of on-off frequencies. A plurality of the on-off frequencies are the same as each other or different from each other, or a plurality of the on-off frequencies are partially the same or partially different. The light which is emitted by a plurality of the light-emitting components forms a first light ray and a second light ray. The second light ray forms a detection light ray after passing through a fluid-to-be measured (i.e. a portion of the second light ray not absorbed by the fluid-to-be measured forms a detection light ray after passing through a fluid-to-be measured). The first optical receiver receives the first light ray. The second optical receiver receives the detection light ray. When the first light ray has a standard light intensity, a light intensity of the second light ray has a specific ratio to the standard light intensity, and a ratio of the detection light ray to the standard light intensity is a standard transmittance ratio of the fluid-to-be measured; and when the first light ray has a working light intensity, a light intensity of the second light ray and the working light intensity shows the specific ratio, and a ratio of the detection light ray to the working light intensity is a working transmittance ratio of the fluidto-be measured, and the standard light intensity and the working light intensity are different. A comparison result between the standard transmittance ratio and the working transmittance ratio is used to determine a composition change of the fluid-to-be measured.

The invention provides an optical analysis system which includes an optical analyzer and a liquid transport member. The liquid-to-be-measured is transported in the liquid transport member. The first optical receiver and the second optical receiver are arranged on two sides of the liquid transport member. The second light ray passes through the liquid transport member to form a detection light ray to be received by the second optical receiver.

The optical analysis system and optical analyzer of the present invention emits lights one by one by using a light source in a plurality of light-emitting components to emit light rays of different wavelength ranges without the need to install a monochromator in the prior art to greatly reduce the volume of the optical analyzer. Moreover, the optical analyzer of the present invention is provided with a first optical receiver and a second optical receiver to detect the attenuation state of the light intensity of the light-emitting component.

These and other objectives of the present invention will no doubt become obvious to those of ordinary skill in the art after reading the following detailed description of the preferred embodiment that is illustrated in the various FIGS. and drawings.

BRIEF DESCRIPTION OF THE DRAWINGS

FIG. 12 is a system block diagram of an electronic device which the optical analyzer of the present invention is signal-communicatively connected to.

DETAILED DESCRIPTION

Figure 1:
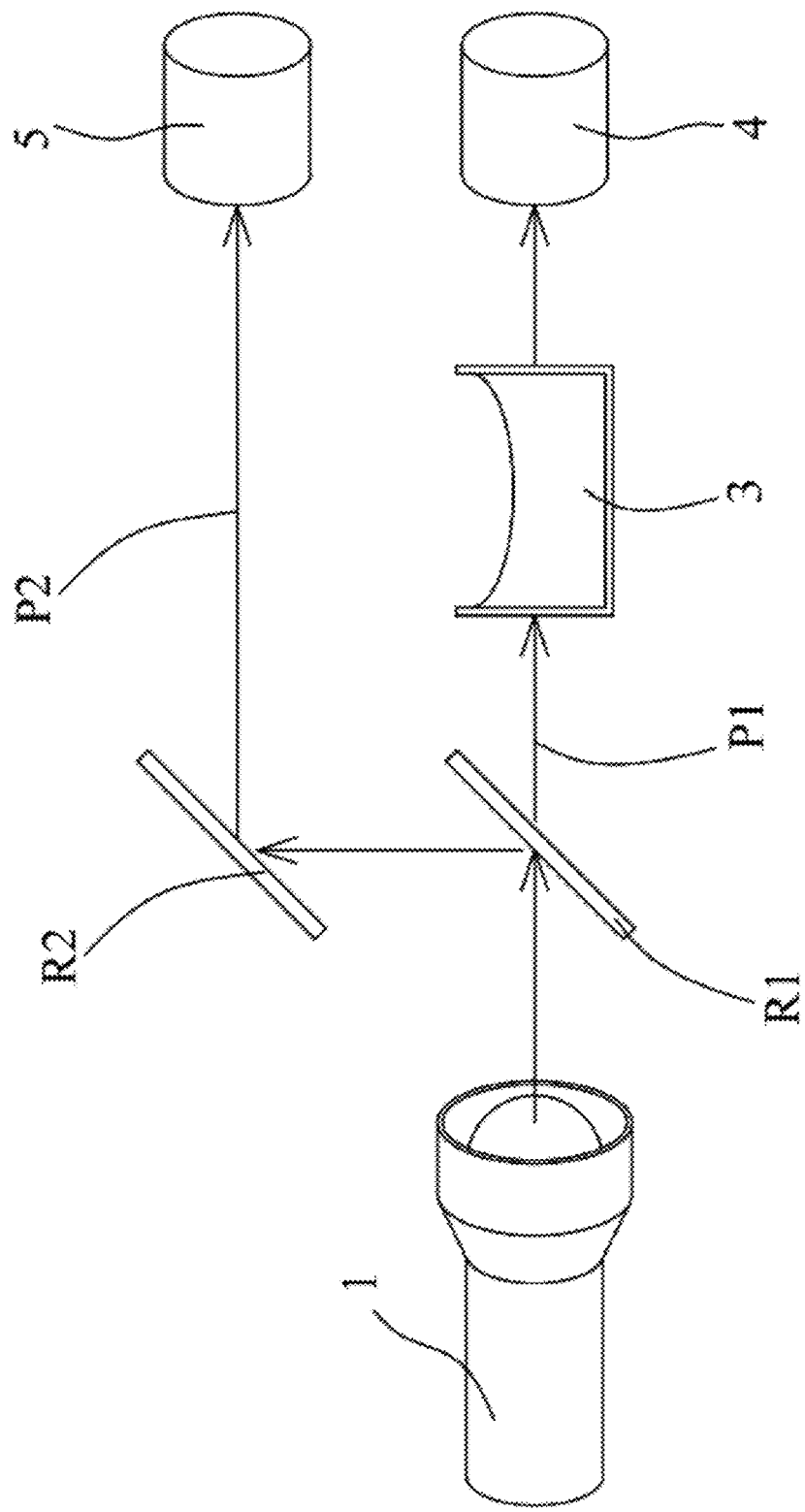
FIG. 1 is a schematic diagram of an optical analyzer of the current technique.
Figure 2:
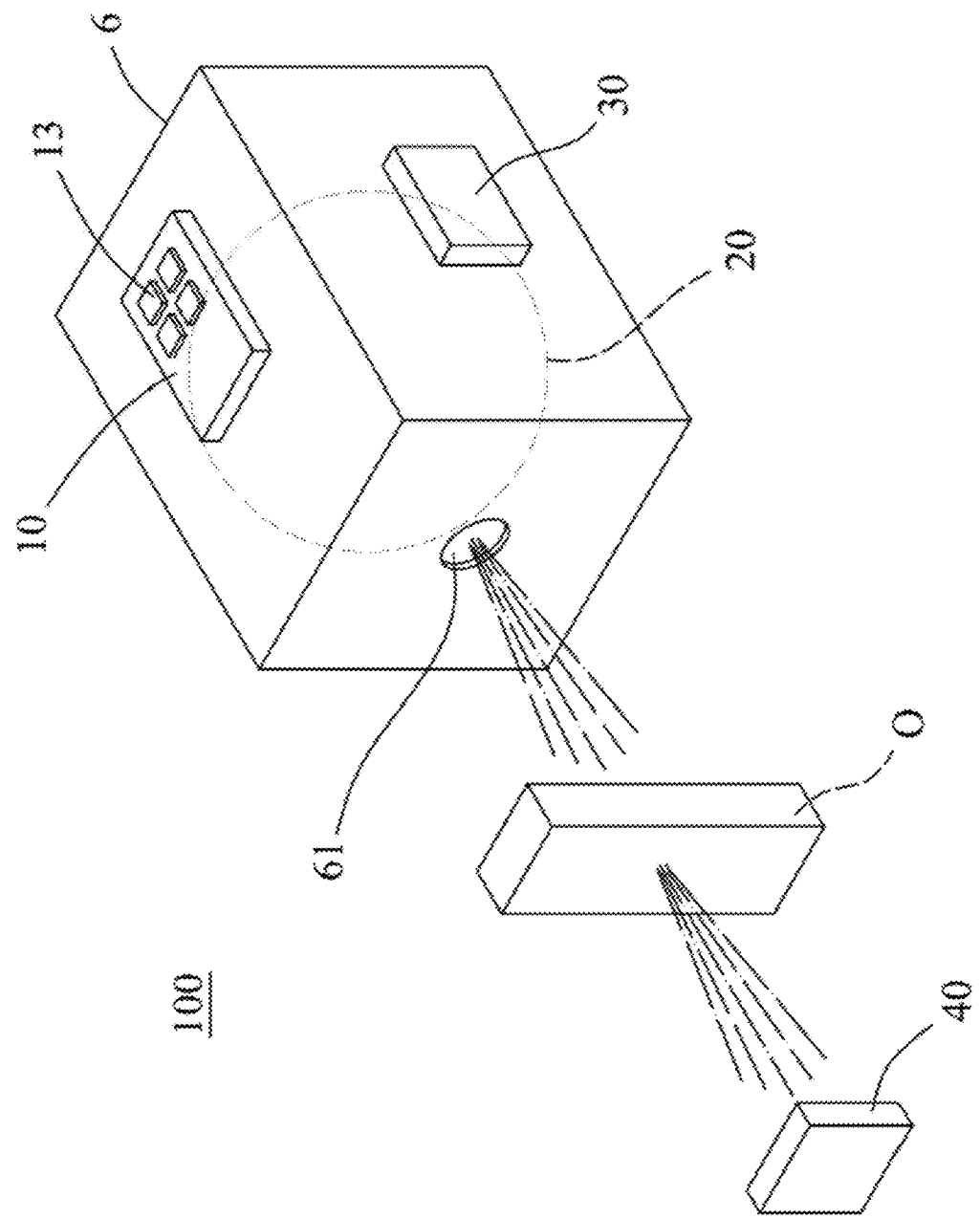
FIG. 2 is a schematic diagram of an embodiment of the optical analyzer of the present invention.
Figure 3:
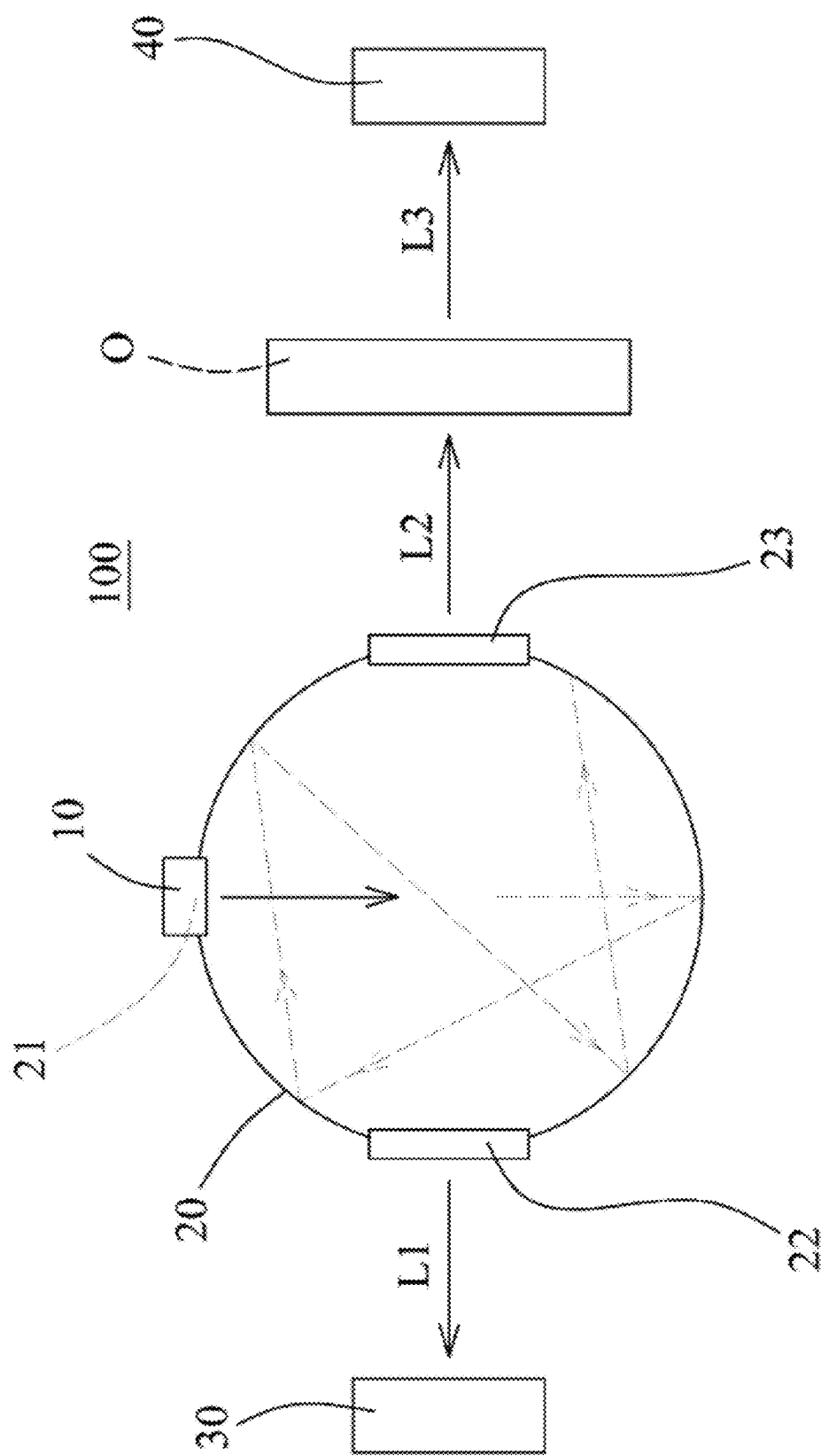
FIG. 3 is a cross-sectional view of the optical analyzer of FIG. 2.

Please refer to FIG. 2 and FIG. 3. They illustrate an embodiment of the optical analyzer of the present invention. The optical analyzer 100 of this embodiment includes a solid-state light source emitter 10, a uniformly mixing or light-splitting component 20, a first optical receiver 30 and a second optical receiver 40. The solid-state light source emitter 10 includes a light source. The light source includes each one of a plurality of light-emitting components 13 emitting a light with at least one peak emission wavelength and at least one wavelength range. A plurality of the light-emitting components 13 are light-emitting diodes, vertical resonant cavity surface-emitting lasers or laser diodes, and a plurality of the light-emitting components 13 can respectively exhibit discontinuous illumination of on-off frequencies. A plurality of the on-off frequencies may be the same as each other or different from each other, or a plurality of the on-off frequencies may be partially the same or partially different.

The light emitted by a plurality of the light-emitting components 13 forms a first light ray L1 and a second light ray L2 after passing through the uniformly mixing or light-splitting component 20. The second light ray L2 forms a detection light ray L3 after passing through the fluid-to-be-measured O. Simply speaking, when the second light ray L2 passes through the fluid-to-be-measured O, a portion of it is absorbed by the fluid-to-be-measured O, and there is another portion which is not absorbed by the fluid-to-be-measured O. The portion in the second light ray L2 which is not absorbed by the fluid-to-be-measured O forms the above-mentioned detection light ray L3. The first optical receiver 30 receives the first light ray L1. The second optical receiver 40 receives the detection light ray L3. Wherein, when the first light ray has a standard light intensity, there is a specific ratio between a light intensity of the second light ray L2 and the standard light intensity (that is, the ratio of the standard light intensity of the first light ray L1 divided by the light intensity of the second light ray L2 is the specific ratio), and a ratio of the detection light ray L3 to the standard light intensity is a standard transmittance ratio of the fluid-to-be measured O; and when the first light ray L1 has a working light intensity, the light intensity of the second light ray L2 and the working light intensity exhibits the specific ratio, and a ratio of the detection light ray L3 to the working light intensity is a working transmittance ratio of the fluid-to-be measured O, and the standard light intensity and the working light intensity are different. By the comparison between the standard transmittance ratio and the working transmittance ratio, a composition change of the fluid-to-be measured O may be determined according to the comparison result. For example, the fluid-to-be measured O may be a production solution for use in a printed circuit board (PCB), a semiconductor, a petrochemical industry or the food processing industry, and the standard transmittance ratio represents the composition ratio and concentration of the fluid-to-be-measured O required for normal operation. When the standard transmittance ratio is the same as the working transmittance ratio or the difference between them is within a tolerable range, it is determined that the composition of the fluid-to-be-measured O still meets the user's demands. However, when the standard transmittance ratio and the working transmittance ratio are different and the difference between them is beyond the tolerable range, it is determined that the composition ratio and concentration of the fluid-to-be-measured O has changed to result in a production solution required for abnormal operation, and the current production solution needs to be replaced or adjusted. The present invention can monitor in real time or dynamically continuously record whether the transmittance ratio and the composition ratio and concentration of the current fluid-to-be-measured O meet the quality required for the normal operation through the first optical receiver 30 which receives the first light ray L1 and through the second optical receiver 40 which receives the detection light ray L3 passing through the fluid-to-be-measured O. Or, the service life can be further estimated to be prepared for the replacement operation or the adjustment operation of the fluid-to-be-measured O in advance.

The above specific ratio may be determined by the uniformly mixing or light-splitting component 20. For example, when the specific ratio is 50%, it means that the light intensity of the second light ray L2 is the same as the standard light intensity when the first light ray L1 has the standard light intensity, and that the light intensity of the second light ray L2 is the same as the working light intensity when the first light ray L1 has the working light intensity. However, the present invention is not limited to 50% for the specific ratio, and preferably between 25% and 75% to ensure that there is no need to overly increase the power of the solid-state light source emitter 10.

Furthermore, the detection light ray L3 is generated by the second light ray L2 passing through the fluid-to-be-measured O, to be expressed as L3_intensity=L2_intensity*k1, wherein L3_intensity is the light intensity of the detection light ray L3, L2_intensity is the light intensity of the second light ray L2, k1 is a value less than or equal to 1, and k1 is related to the transmittance ratio of the fluid-to-be-measured O. When the light intensity of the first light ray L1 exhibits a specific ratio to the light intensity of the second light ray L2, it means L1_intensity=L2_intensity*k2, wherein L1_intensity is the light intensity of the first light ray L1 and k2 is the specific ratio. Therefore, it is deduced that k2/k1=L3_intensity/L1_intensity (L3_intensity/L1_intensity, it is defined as the transmittance ratio of the fluid-to-be-measured O in the present invention), that is, when the transmittance ratio of the fluid-to-be-measured O and the specific ratio k2 have no change, there is a proportional relationship between the light intensity of the first light ray L1 and the light intensity of the detection light ray L3. In other words, when the light intensity of the first light ray L1 changes from the standard light intensity to the working light intensity and the specific ratio k2 remains unchanged, the ratio between the light intensity of the first light ray L1 and the light intensity of the detection light ray L3 does not change either as long as the transmittance ratio of the fluid-to-be-measured O does not change. Once the transmittance ratio of the fluid-to-be-measured O changes, correspondingly, the ratio between the light intensity of the first light ray L1 and the light intensity of the detection light ray L3 also changes, and k1 also changes accordingly. In this way, even if the light intensity of the first light ray L1 is not equal to the light intensity of the second light ray L2, it is still able to successfully measure whether the transmittance ratio of the fluid-to-be-measured O changes (that is, whether the composition of the fluid-to-be-measured O changes).

The first light ray L1 and the second light ray L2 are formed after the light rays emitted by a plurality of the light-emitting components 13 passes through the uniformly mixing or light-splitting component 20. The second light ray L2 forms the detection light ray L3 after passing through the fluid-to-be-measured O. The first optical receiver 30 receives the first light ray L1. The second optical receiver 40 receives the detection light ray L3. Wherein, when the first light ray L1 has a standard light intensity, the first optical receiver 30 receives the first light ray L1 to generate a standard light intensity signal; and when the first light ray L1 has an attenuated light intensity, the first optical receiver 30 receives the first light ray L1 to generate an attenuated light intensity signal. By the comparison of the change value between the standard light intensity signal and the attenuated light intensity signal, the uniformly mixing or light-splitting component 20 adjusts the light intensity of the first light ray L1 according to the change value to obtain a measurement system with the light intensity in a constant range. The present invention can monitor in real time whether the light intensity of the light source of the solid-state light source transmitter 10 attenuates and the change value in term of the attenuation of the light intensity signal through the first optical receiver 30 which receives the first light ray L1, and further adjust or replace the light source of the solid-state light source transmitter 10. If the light intensity of the first light ray L1 is too low, it may lead to the light intensity of the detection light ray L3 accordingly too low so the measured transmittance ratio of the fluid-to-be-measured O is inaccurate. Therefore, it is necessary to keep the light intensity of first light ray L1 within a specific range through the above method to keep the accuracy of the measured transmittance ratio of the fluid-to-be-measured O in a certain range.

The uniformly mixing or light-splitting component 20 in this embodiment is an optical integrating sphere. The optical integrating sphere includes a light entrance 21, a first light exit 22 and a second light exit 23. The first optical receiver 30 is aligned with the first light exit 22. The second optical receiver 40 is aligned with the second light exit 23. A plurality of light rays emitted by a plurality of the light-emitting components 13 enter the optical integrating sphere through the light entrance 21. The first light ray L1 is emitted from the first light exit 22, and the second light ray L2 is emitted from the second light exit 23. As shown in FIG. 2, the first light exit 22 and the light entrance 21 are separated by a center angle of 90 degrees of the circle relative to the center of the optical integrating sphere. The second light exit 23 and the light entrance 21 are separated by a center angle of 90 degrees of the circle relative to the center of the optical integrating sphere, and the first light exit 22 and the second light exit 23 are separated by a center angle of 180 degrees of the circle relative to the center of the optical integrating sphere.

The optical integrating sphere of the uniformly mixing or light-splitting component 20 in this embodiment is disposed in the accommodating housing 6. The solid-state light source transmitter 10 and the first optical receiver 30 are respectively disposed on the side walls of the accommodating housing 6. The accommodating housing 6 has an opening 61. The opening 61 is aligned with the second light exit 23, so that the second light ray L2 can be emitted from the accommodating housing 6 through the opening 61.

Figure 4:
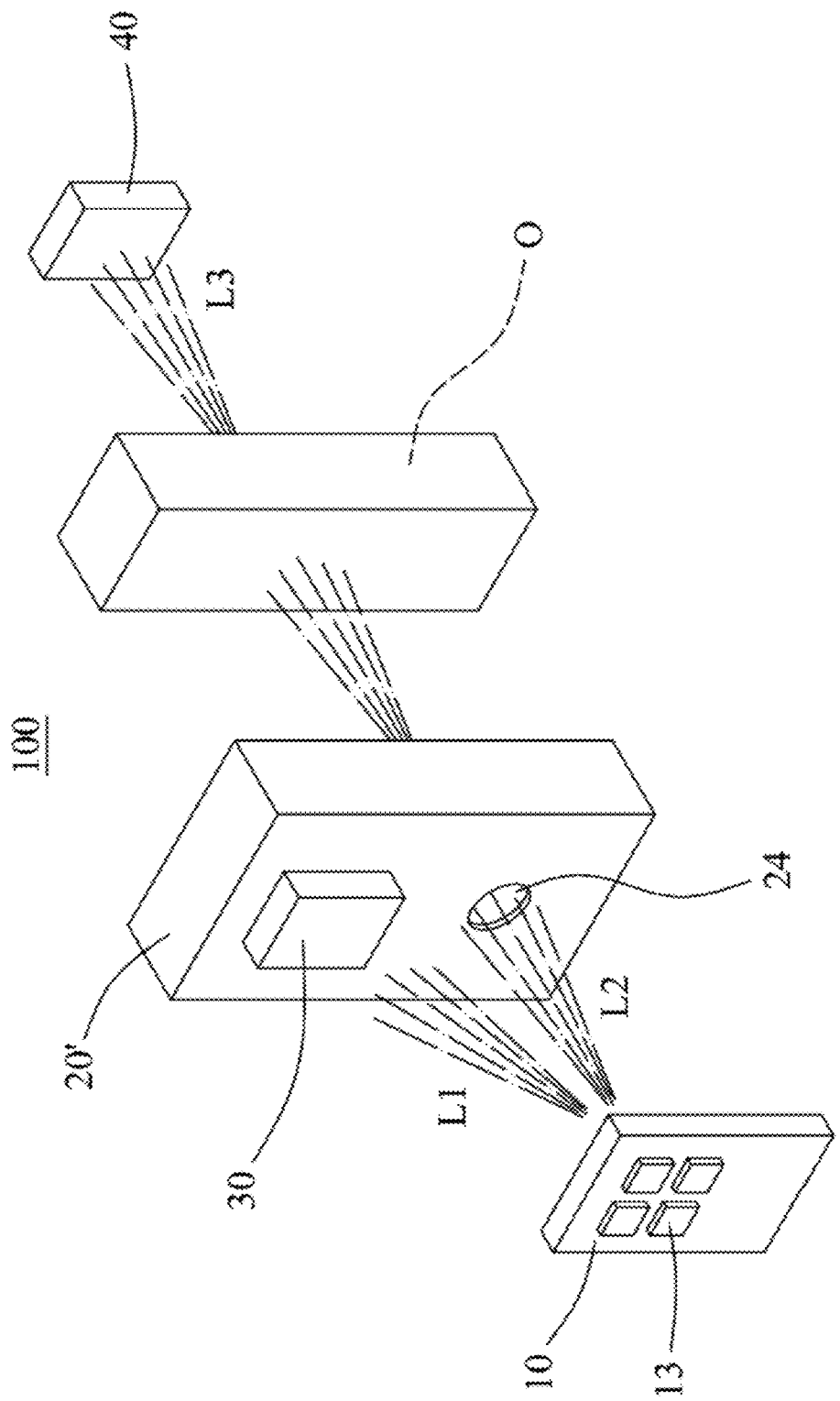
FIG. 4 is a schematic diagram of another embodiment of the optical analyzer of the present invention.

Please refer to FIG. 4. It illustrates another embodiment of the optical analyzer of the present invention. Some structures in this embodiment is the same as those in the embodiment of FIG. 2 so the same components are given the same symbols and their descriptions are omitted. The uniformly mixing or light-splitting component 20' of this embodiment is a shielding plate with a through hole 24. The first optical receiver 30 is provided on the shielding plate and faces a plurality of the light-emitting components 13. A portion of the light rays emitted from a plurality of the light-emitting components 13 becomes the first light ray L1 and is received by the first optical receiver 30. Another portion of the light rays emitted from a plurality of the light-emitting components 13 passes through the through holes 24 and becomes the second light ray L2. The second light ray L2 forms a detection light ray L3 after passing through the fluid-to-be-measured O and is received by the second optical receiver 40. Similarly, by comparing whether the intensity of the first light ray L1 is the same as the intensity of the detection light ray L3, the light intensity of a plurality of light rays emitted from a plurality of the light-emitting components 13 is adjusted according to the comparison results.

In addition, in the light rays emitted from the light-emitting components 13 of the light source of the solid-state light source emitter 10 of the present invention, a plurality of wavelength ranges of two light-emitting components 13 to which two adjacent peak emission wavelengths correspond partially overlap to form a continuous wavelength range which is wider than the wavelength range in each of a plurality of the light-emitting components 13, or a plurality of the wavelength ranges of two light-emitting components 13 to which two adjacent peak emission wavelengths correspond do not overlap.

Figure 5:
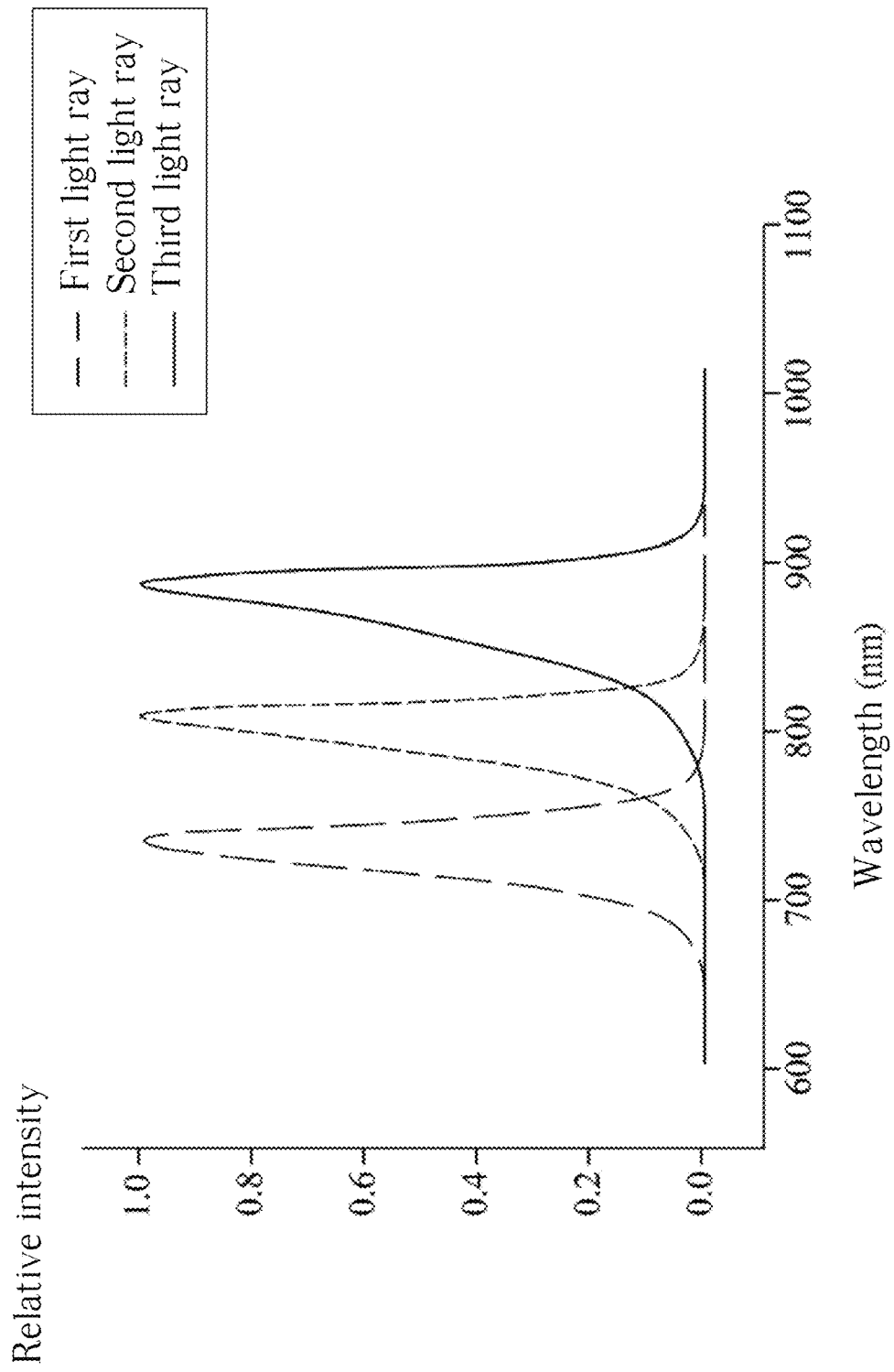
FIG. 5 is an emission spectrum diagram of a light-emitting diode in the first embodiment of the solid-state light source emitter of the optical analyzer of the present invention.

Please refer to FIG. 5. A plurality of wavelength ranges of two light-emitting diodes to which two adjacent peak emission wavelengths correspond partially overlap to form a continuous wavelength range which is wider than the wavelength range in each of a plurality of the light-emitting diodes. The continuous wavelength range is between 180 nm and 2500 nm. In FIG. 2, there are three peak emission wavelengths and the corresponding wavelength ranges. They are the first wavelength range to which the first peak emission wavelength (734 nm) of the first light ray correspond, the second wavelength range to which the second peak emission wavelength (810 nm) of the second light ray correspond, and the third wavelength range to which the third peak emission wavelength (882 nm) of the third light ray correspond. The first peak emission wavelength and the second peak emission wavelength are two adjacent peak emission wavelengths. Similarly, the second peak emission wavelength and the third peak emission wavelength are also two adjacent peak emission wavelengths. The first wavelength range to which the first peak emission wavelength corresponds is between 660 nm and 780 nm. The second wavelength range to which the second peak emission wavelength of the second light ray corresponds is between 710 nm and 850 nm. The first wavelength range and the second wavelength range partially overlap between 710 nm and 780 nm, so the first wavelength range and the second wavelength range together form a continuous wavelength range between 660 nm and 850 nm. Similarly, the second wavelength range to which the second peak emission wavelength corresponds is between 710 nm and 850 nm, and the third wavelength range to which the third peak emission wavelength of the third light ray corresponds is between 780 nm and 940 nm. The second wavelength range and the third wavelength range partially overlap between 780 nm and 850 nm, so the second wavelength range and the third wavelength range together form a continuous wavelength range between 710 nm and 940 nm. In the present invention, the overlapping portion of a plurality of wavelength ranges of two light-emitting diodes to which two adjacent peak emission wavelengths correspond should be as small as possible. Of course, a plurality of wavelength ranges of two light-emitting diodes to which two adjacent peak emission wavelengths correspond may not overlap, either. This will be explained later.

The difference between adjacent two peak emission wavelengths is greater than or equal to 0.5 nm, preferably between 1 nm and 80 nm, and more preferably between 5 nm and 80 nm. In FIG. 2, the difference between the adjacent first peak emission wavelength (734 nm) and the second peak emission wavelength (810 nm) is 76 nm, and the difference between the adjacent second peak emission wavelength (810 nm) and the third peak emission wavelength (882 nm) is 72 nm. Unless otherwise specified, the limits of the numerical ranges described in the present invention and in the patent scope always include end values. For example, the difference between the adjacent two peak emission wavelengths as mentioned above is between 5 nm and 80 nm, which refers to greater than or equal to 5 nm and to less than or equal to 80 nm.

Figure 6:
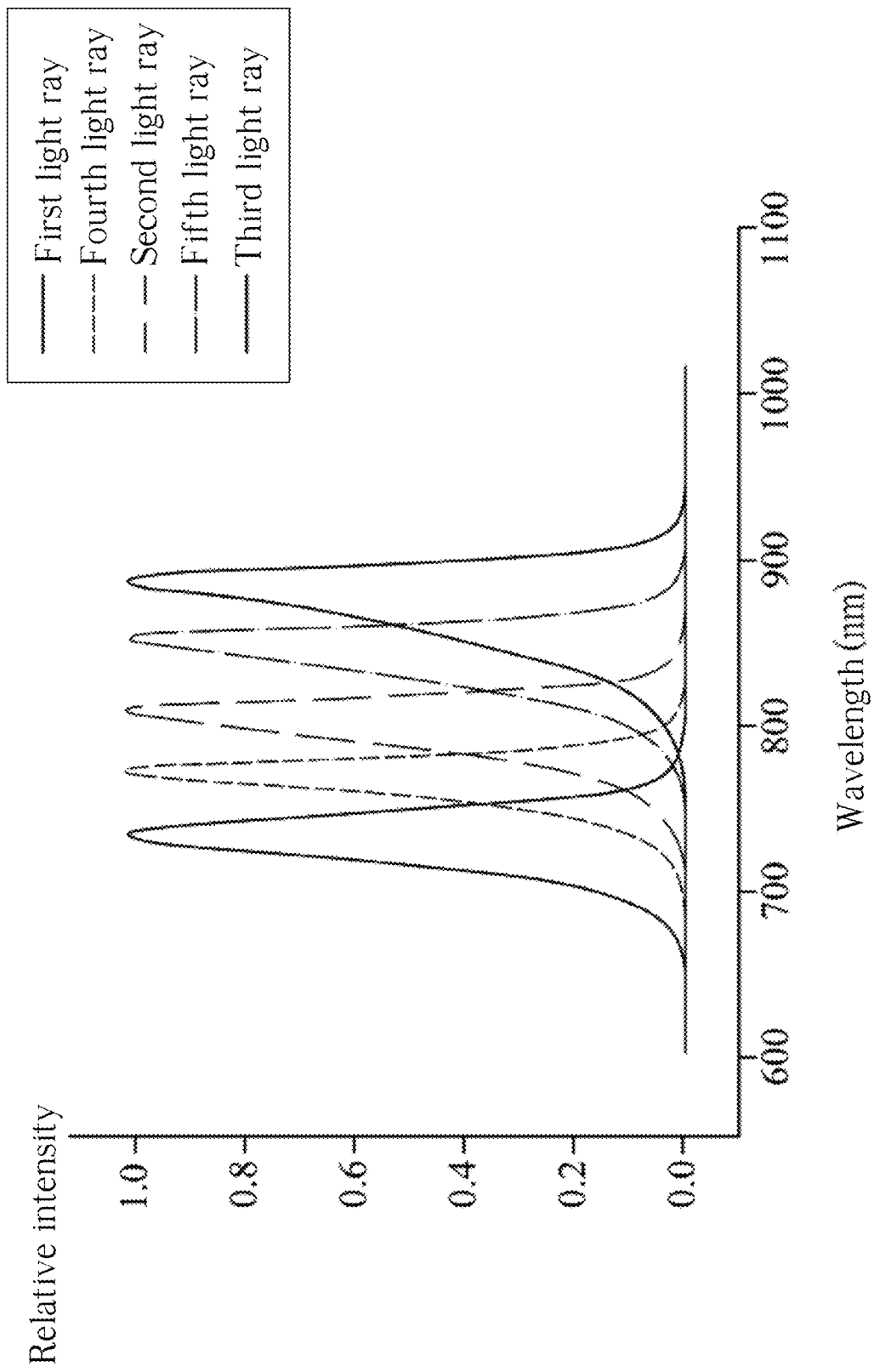
FIG. 6 is an emission spectrum diagram of a light-emitting diode in the second embodiment of the solid-state light source emitter of the optical analyzer of the present invention.

Please refer to the second embodiment of FIG. 6 together. The second embodiment is a derivative embodiment of the first embodiment, so no description is given to the similar parts between the second embodiment and the first embodiment. The difference between the second embodiment and the first embodiment resides in that the light source of the second embodiment includes five light-emitting diodes which respectively a first light-emitting diode emitting first light ray having a first wavelength range, a fourth light-emitting diode emitting a fourth light ray having a fourth wavelength range, a second light-emitting diode emitting second light ray having a second wavelength range, a fifth light-emitting diode emitting a fifth light ray having a fifth wavelength range, and a third light-emitting diode emitting a third light ray having a third wavelength range. The fourth light ray has a fourth peak emission wavelength (772 nm) within the fourth wavelength range. The fifth light ray has a fifth peak emission wavelength (854 nm) within the fifth wavelength range. In FIG. 3, the peak emission wavelengths in ascending order are the first peak emission wavelength (734 nm), the fourth peak emission wavelength (772 nm), the second peak emission wavelength (810 nm), the fifth peak emission wavelength (854 nm) and the third peak emission wavelength (882 nm). The difference between the adjacent first peak emission wavelength (734 nm) and the fourth peak emission wavelength (772 nm) is 38 nm, the difference between the adjacent fourth peak emission wavelength (772 nm) and the second peak emission wavelength (810 nm) is 38 nm, the difference between the adjacent second peak emission wavelength (810 nm) and the fifth peak emission wavelength (854 nm) is 44 nm, and the difference between the adjacent fifth peak emission wavelength (854 nm) and the third peak emission wavelength (882 nm) is 28 nm.

Figure 7:
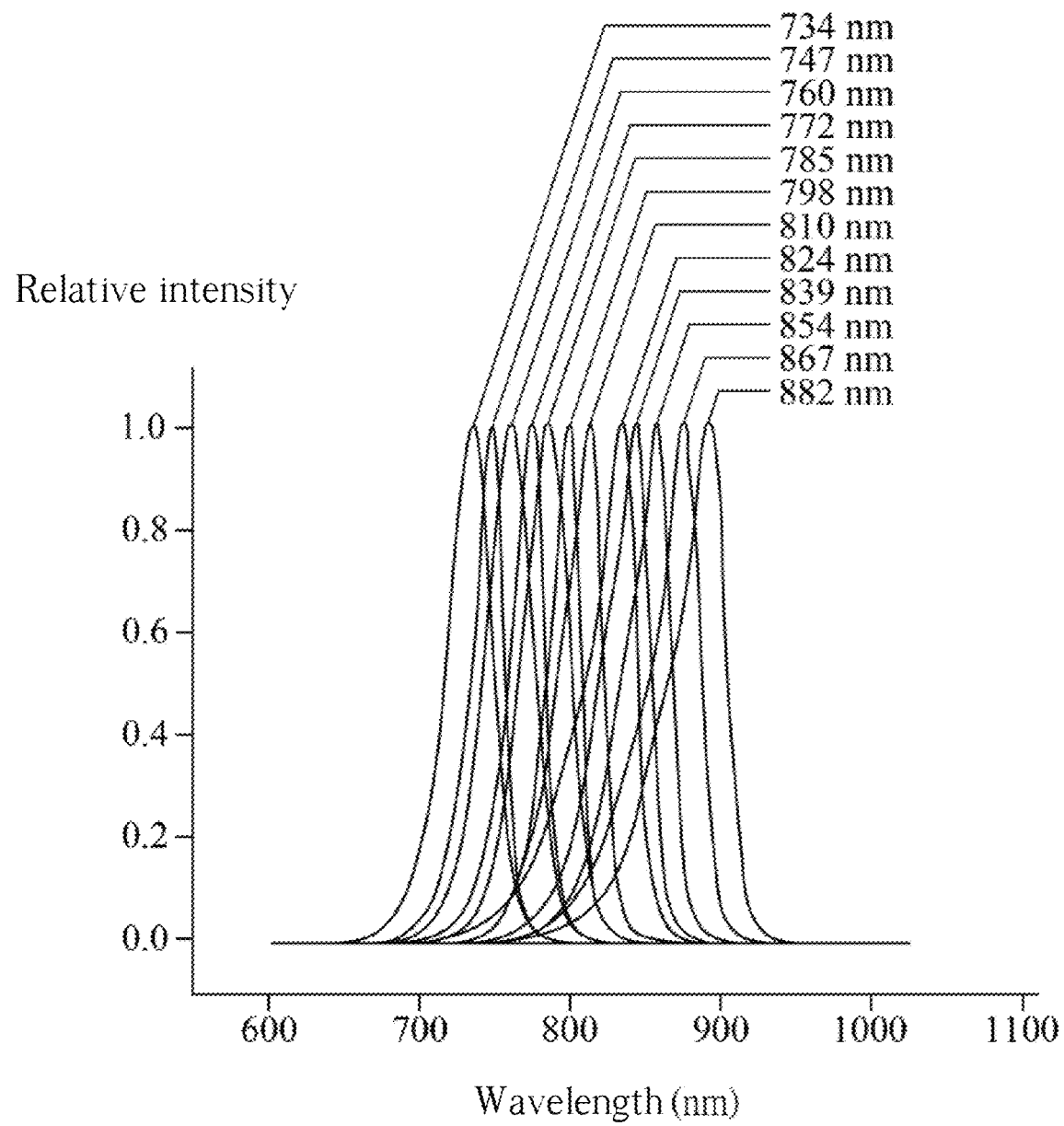
FIG. 7 is an emission spectrum diagram of a light-emitting diode in the third embodiment of the solid-state light source emitter of the optical analyzer of the present invention.
Figure 8:
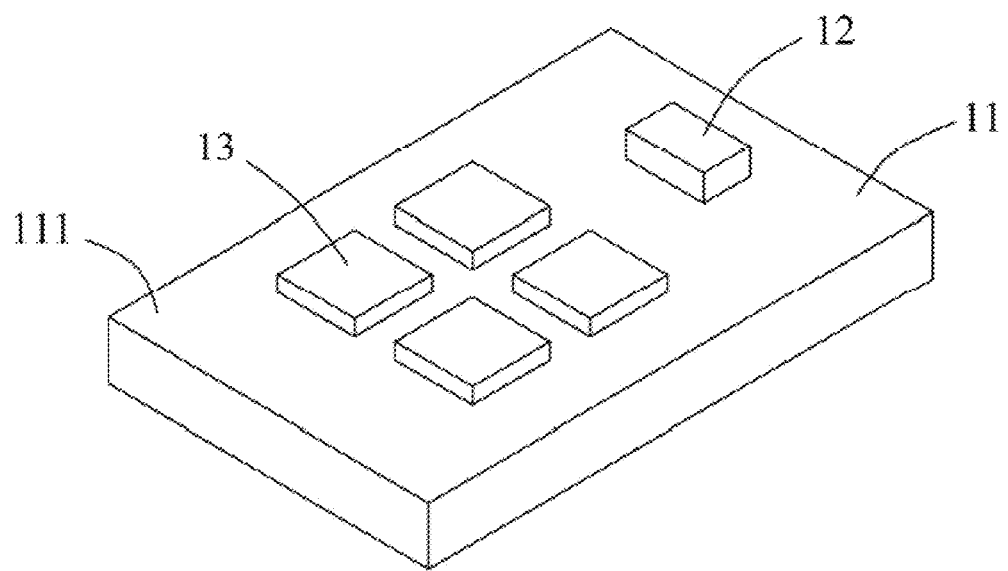
FIG. 8 is a schematic diagram of an embodiment of a solid-state light source emitter of the optical analyzer of the present invention.

Please refer to the third embodiment of FIG. 7 together. The third embodiment is a derivative embodiment of the first embodiment and of the second embodiment, so no description is given to the similar parts between the third embodiment and the first embodiment/the second embodiment. The difference between the third embodiment and the first embodiment resides in that the light source of the third embodiment includes 12 light-emitting diodes. In FIG. 8, the peak emission wavelengths of the 12 light-emitting diodes in ascending order are 734 nm (the first peak emission wavelength), 747 nm, 760 nm, 772 nm (the fourth peak emission wavelength), 785 nm, 798 nm, 810 nm (the second peak emission wavelength), 824 nm, 839 nm, 854 nm (the fifth peak emission wavelength), 867 nm and 882 nm (the third peak emission wavelength). Among the peak emission wavelengths of the 12 light-emitting diodes, the differences between adjacent two peak emission wavelengths are 13 nm, 13 nm, 12 nm, 13 nm, 13 nm, 12 nm, 14 nm, 15 nm, 15 nm, 13 nm and 15 nm in order. If the light-emitting element in the first embodiment, in the second embodiment and in the third embodiment is changed to a laser diode, the difference between adjacent two peak emission wavelengths may be greater than or equal to 0.5 nm, such as 1 nm.

A full width at half maximum to which at least a portion of the peak emission wavelength in a plurality of peak emission wavelengths corresponds is greater than 0 nm and less than or equal to 60 nm. For example, the peak emission wavelengths in the first embodiment, in the second embodiment and in the third embodiment in ascending order are 734 nm (the first peak emission wavelength), 747 nm, 760 nm, 772 nm (the fourth peak emission wavelength), 785 nm, 798 nm, 810 nm (the second peak emission wavelength), 824 nm, 839 nm, 854 nm (the fifth peak emission wavelength), 867 nm and 882 nm (the third peak emission wavelength). Preferably, the full width at half maximum to which the first peak emission wavelength of the first light ray corresponds, the full width at half maximum to which the second peak emission wavelength of the second light ray corresponds, the full width at half maximum to which the third peak emission wavelength of the third light ray corresponds, the full width at half maximum to which the fourth peak emission wavelength of the fourth light ray corresponds, the full width at half maximum to which the fifth peak emission wavelength of the fifth light ray corresponds is greater than 0 nm and less than or equal to 60 nm, preferably between 15 nm and 50 nm, and more preferably between 15 nm and 40 nm. The full width at half maximum (FIG. 4) which other unspecified peak emission wavelengths 747 nm, 760 nm, 785 nm, 798 nm, 824 nm, 839 nm and 867 nm correspond to is also greater than 0 nm and less than or equal to 60 nm, preferably between 15 nm and 50 nm, and more preferably between 15 nm and 40 nm. During the experimental operations of the present invention, the full width at half maximum which the peak emission wavelengths in the aforementioned first embodiment, second embodiment and third embodiment correspond to is 55 nm. If the light-emitting element 13 is a laser diode, the full width at half maximum which each the peak emission wavelength correspond to is greater than 0 nm and less than or equal to 60 nm, for example, 1 nm.

A plurality of the wavelength ranges of two light-emitting diodes to which adjacent two peak emission wavelengths correspond may not overlap. For example, if the full width at half maximum which each the peak emission wavelength in the first embodiment, in the second embodiment and in the third embodiment corresponds to is 15 nm, the width of the wavelength range which each the peak emission wavelength corresponds to (that is, the difference between the maximum value and the minimum value of the wavelength ranges) is 40 nm. The difference between adjacent two peak emission wavelengths is 80 nm. For another example, if the light-emitting element is a laser diode, the full width at half maximum which each the peak emission wavelength corresponds to is 1 nm, the width of the wavelength range is 4 nm, and the difference between adjacent two peak emission wavelengths is 5 nm, then a plurality of the wavelength ranges of two light-emitting elements (laser diodes) to which adjacent two peak emission wavelengths correspond do not overlap.

Preferably, to operate an imaging device to carry out the detection of the object-to-be-measured to generate the spectrum drawing of the object-to-be-measured in the first embodiment, in the second embodiment and in the third embodiment, the imaging device is a mobile phone or a tablet computer. As mentioned above, the solid-state light source emitter 10 can separately control to cause a plurality of light-emitting diodes to respectively exhibit discontinuous illumination of on-off frequencies. A plurality of the on-off frequencies may be the same as each other or different from each other, or a plurality of the on-off frequencies may be partially the same or partially different. The aforementioned on-off frequencies are between 0.05 time/second and 50000 times/second. The time interval for turning on (light on) the light-emitting diode in the on-off frequencies is between 0.00001 second and 10 seconds, and the time interval for turning off (light off) the light-emitting diode in the on-off frequencies is between 0.00001 seconds and 10 seconds. The period of the on-off frequency refers to the sum of one consecutive time interval to turn on (light on) the light-emitting diode and time interval to turn off (light off) the light-emitting diode, the period of the on-off frequency is the reciprocal of the on-off frequency. In other words, the period of the on-off frequency can be understood as the sum of continuous turning on—the time interval to turn on and immediately continuous turning off—the time interval to turn off a plurality of light emitting diodes without interruption. The time interval to turn on is between 0.00001 second and 10 seconds. The time interval to turn off is between 0.00001 second and 10 seconds. Preferably, the on-off frequencies are between 0.5 time/second and 50,000 times/second; more preferably, the on-off frequencies are between 5 times/second and 50,000 times/second. A plurality of light-emitting diodes exhibiting a discontinuous illuminating state can greatly reduce the influence of the heat energy of the light emitted by the light-emitting diodes on the object-to-be-measured (A) to avoid qualitative changes of the object-to-be-measured (A) which contains organisms. Therefore, it is particularly suitable for an object-to-be-measured (A) which is sensitive to heat energy, and particularly suitable for the light emitted by the light-emitting diode in the wavelength range of near-infrared light.

In addition, a plurality of the light-emitting components 13 emit light sequentially. The aforementioned emit light sequentially means that a plurality of the light-emitting components 13 emitting light in the same wavelength range at different positions do not emit light at the same time; or, a plurality of the light-emitting components 13 partially emit light at the same time. The aforementioned partially emit light at the same time refers to using a plurality of the light-emitting components 13 to make some of them light at the same time and emit light in different wavelength ranges at the same time. In addition, in order to make the spectrum continuous and prevent the lights in two adjacent wavelength ranges from interfering with each other, in another preferred embodiment, a plurality of the light-emitting components 13 in different wavelength ranges emit light at different times. For example, if the six light-emitting components 13 respectively have six different wavelength ranges, the six light-emitting components 13 emit light at different times to ensure that lights of two adjacent wavelength ranges do not interfere with each other.

Please refer to FIG. 8. It illustrates an embodiment of the solid-state light source emitter of the present invention. The solid-state light source emitter 10 of this embodiment includes a substrate 11, a temperature sensor 12 and a plurality of light-emitting components 13. A plurality of the light-emitting components 13 and the temperature sensor 12 are disposed at the junction 111 of the substrate 11. The bias values of a plurality of the light-emitting components are measured, and the junction temperature of the junction 111 is obtained by referring to a mathematical relationship formula or a corresponding table or diagram between the PN junction temperature and the bias values of a plurality of the light-emitting components 13. Then an emission intensity of a plurality of the light-emitting components 13 is obtained by referring to a mathematical relationship formula or a corresponding table or diagram between the light intensity of a plurality of the light-emitting components 13 and the PN junction temperature to determine whether the emission intensity of a plurality of the light-emitting components 13 changes and the light intensity of the light rays from a plurality of the light-emitting components 13 is adjusted according to a determined result.

In another embodiment of the present invention, the solid-state light source emitter 10 further includes a substrate 11 to measure a constant current bias when a plurality of the light-emitting components 13 operate, and a PN junction temperature of the solid-state light source emitter 10 is obtained by referring to a mathematical relationship formula or a corresponding table or diagram between the constant current bias of a plurality of the light-emitting components 13 and the PN junction temperature of the solid-state light source emitter 10. Then an emission intensity ratio of a plurality of the light-emitting components 13 is obtained by a mathematical relationship formula or a corresponding table or diagram between the light intensity of a plurality of the light-emitting components 13 and the PN junction temperature to correct a light intensity value emitted by a plurality of the light-emitting components 13 and measured by the first optical receiver 30 according to a determined result.

Figure 9A:
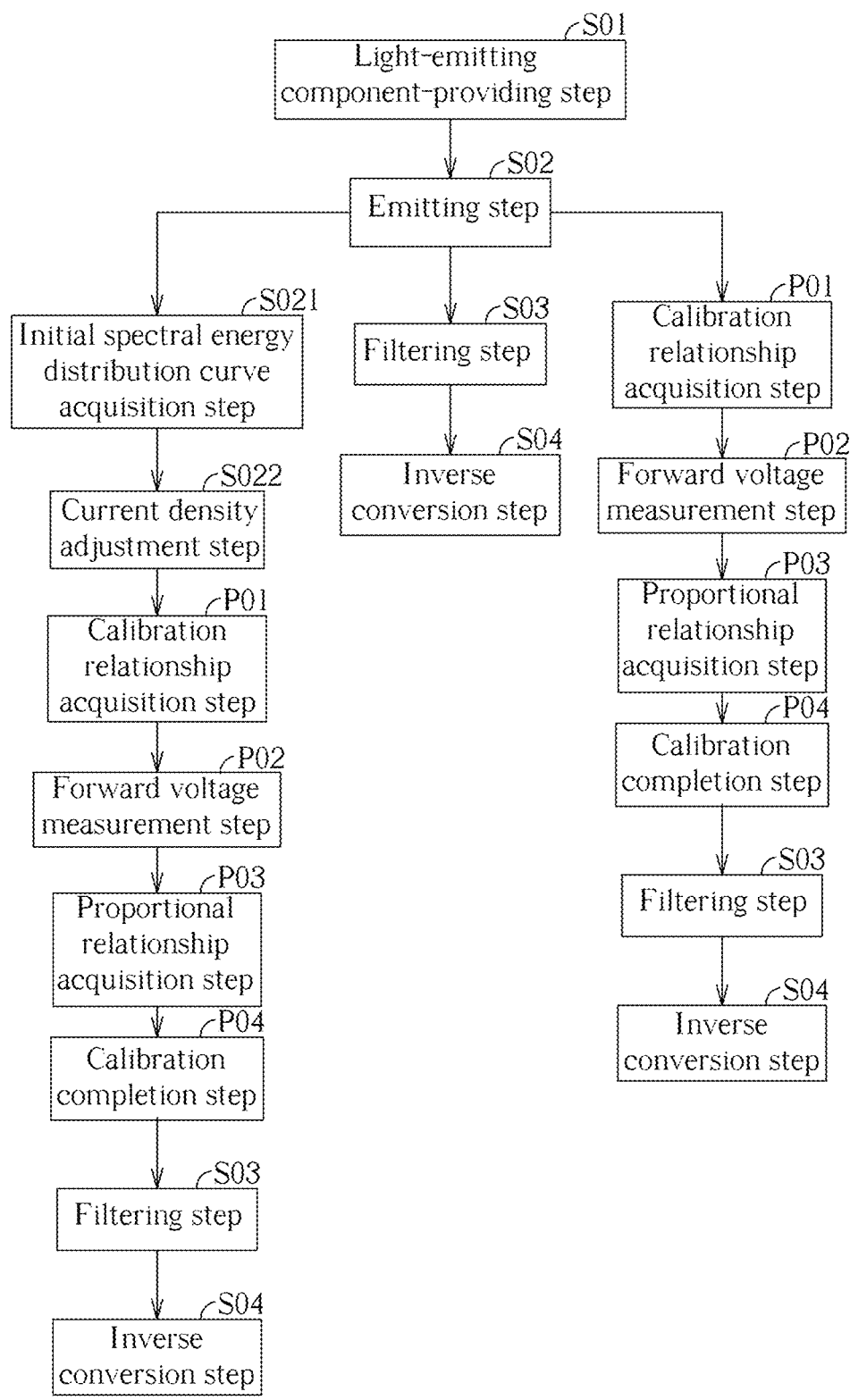
FIG. 9A is a flow chart of a method of calibrating the emission intensity of calibrating a light-emitting component by measuring the temperature.

Due to the inverse relationship between the emission intensity of each light-emitting diode and its junction temperature, and the heat dissipation problem of the light-emitting diodes, the increase in the continuous operation time of the light-emitting diodes under the operation of the current density increases the junction temperature and leads to the decrease of the emission intensity, so it is necessary to calibrate the emission intensity by means of a luminescence correction method. The luminescence correction method sequentially includes a calibration relationship acquisition step P01, a forward voltage measurement step P02, a proportional relationship acquisition step P03, and a calibration completion step P04. The luminescence correction method may follow the luminescence method, and the filtering step S03 and inverse conversion step S04 of the aforementioned spectrum detection method may follow the luminescence correction method; please refer to FIG. 9A.

Figure 9B:
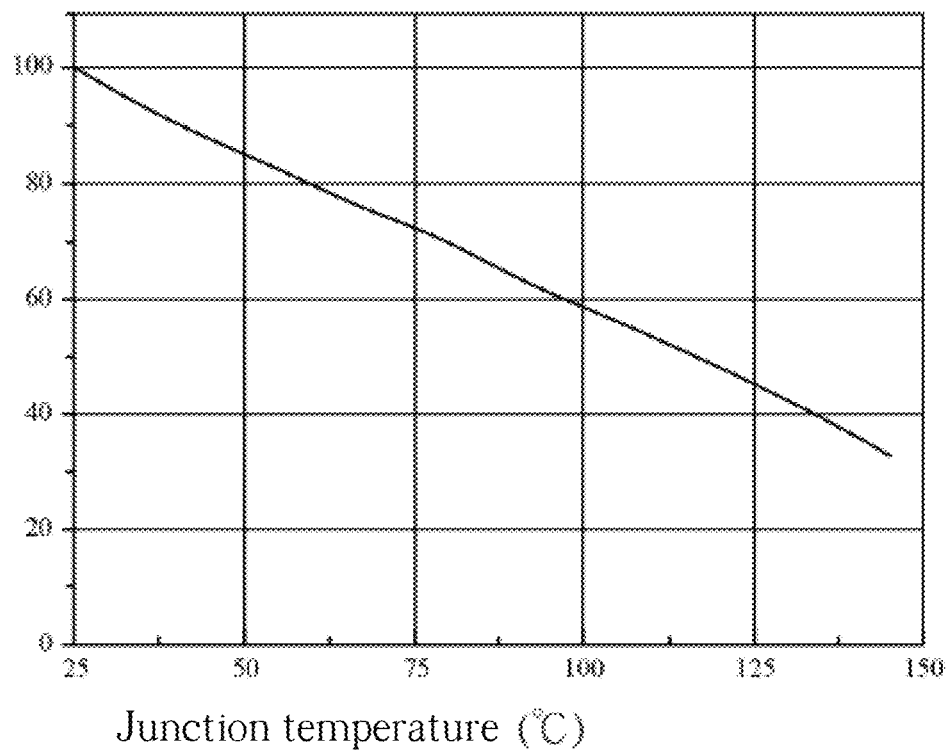
FIG. 9B is a corresponding graph of the junction temperature to the relative intensity of the fourth light-emitting diode of the present invention.
Figure 9C:
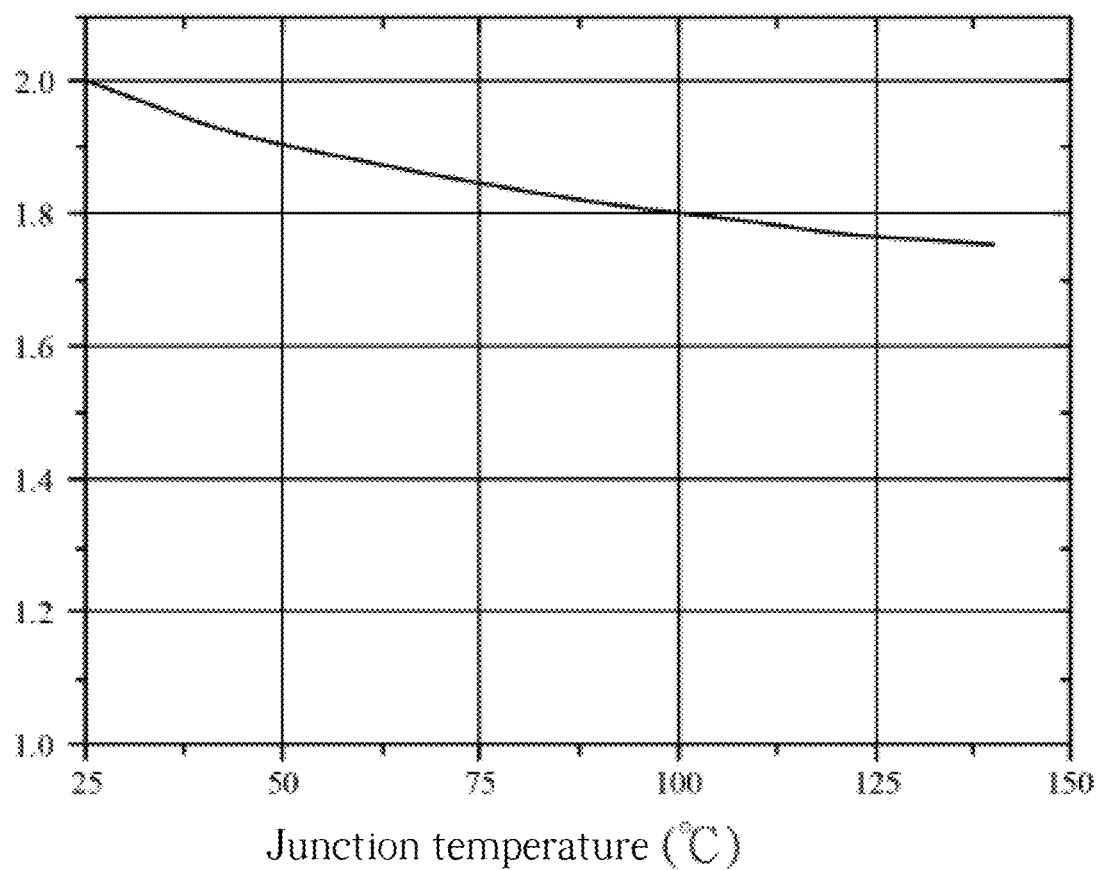
FIG. 9C is a corresponding graph of the junction temperature to the forward bias of the fourth light-emitting diode of the present invention.

Calibration relationship acquisition step P01: Obtaining the mathematical relationship formula or corresponding table or diagram between the emission intensity or relative intensity of each light-emitting diode and the junction temperature, usually provided by the manufacturer of the light-emitting diodes. Please refer to FIG. 9B. FIG. 9B is a corresponding graph of the relative intensity of the fourth light-emitting diode to the junction temperature. The fourth peak emission wavelength of the fourth light-emitting diode is 772 nm when the junction temperature is 25 degrees Celsius and the relative intensity is regarded as 100%. In addition, the mathematical relationship formula or the corresponding table or diagram between the forward voltage and the junction temperature of each light-emitting diode is also obtained. The fourth peak emission wavelength of the fourth light-emitting diode is 772 nm when the junction temperature is 25 degrees Celsius and the forward voltage is 2 volts. Please refer to FIG. 9C. It is a corresponding graph of the forward voltage of the fourth light-emitting diode to the junction temperature. For both the mathematical relationship formula or the corresponding table or diagram between the emission intensity or relative intensity and the junction temperature, and the mathematical relationship formula or the corresponding table or diagram between the forward voltage and the junction temperature of the light-emitting diode, please refer to Journal of Science and Engineering Technology, Vol. 3, No. 4, pp. 99-103 (2007) and the method to perform, disclosed in Taiwanese Patent Publication No. 200818363, so they are not elaborated here again.

Forward voltage measurement step P02: During the time interval when the light-emitting diodes are turned on (light on), for example, the time interval when the light-emitting diodes are turned on (light on) in the on-off frequencies, the forward voltage of the light-emitting diodes is measure at the same time. For example, in the aforementioned second embodiment and third embodiment, the on-off frequency of the fourth light-emitting diode is about 90.90 times/second, the time interval for turning on (light on) the light-emitting diode in the on-off frequencies is 1 millisecond (1 ms), the time interval for turning off (light off) the light-emitting diode in the on-off frequencies is 10 milliseconds (10 ms), and the forward voltage of the fourth light-emitting diode is measured to be 1.9 volts at the same time in the time interval of turning on (light on) the fourth light-emitting diode in the light-off frequency.

Proportional relationship acquisition step P03: Obtain the junction temperature by looking the measured forward voltage up in the aforementioned mathematical relationship formula or the corresponding table or diagram between the forward voltage and the junction temperature of the light-emitting diodes. For example, look the measured forward voltage 1.9 volts of the fourth light-emitting diode up in FIG. 9C to obtain the junction temperature to be 50 degrees Celsius. Then, look the converted junction temperature up in the aforementioned mathematical relationship formula or corresponding table or diagram between the emission intensity or the relative intensity and the junction temperature to obtain the emission intensity or the relative intensity. For example, look the junction temperature of 50 degrees Celsius up in FIG. 9B to obtain the relative intensity of the fourth light-emitting diode to be 83%. Then, compare the obtained emission intensity or the relative intensity with the emission intensity or the relative intensity at a specific junction temperature in the mathematical relationship formula or the corresponding table or diagram between the emission intensity or the relative intensity and junction temperature to obtain a proportional relationship. For example, if the specific junction temperature is 25 degrees Celsius and the relative intensity of the fourth light-emitting diode is 100% at 25 degrees Celsius, the relative intensity 100% at the junction temperature 25 degrees Celsius is divided by the relative intensity 83% at the junction temperature 50 degrees Celsius to obtain the proportional relationship to be 1.20 times.

Calibration completion step P04: Multiply the emission intensity of the wavelength range to which the light-emitting diodes in the aforementioned initial spectral energy distribution curve correspond by the proportional relationship to achieve the calibration of the emission intensity, or multiply the measured spectral signal of the wavelength range to which the light-emitting diode correspond by the proportional relationship to achieve the calibration of the spectral signal. The spectral signal of the wavelength range may be the aforementioned time domain signal of the object-to-be-measured consisting of the spectral signal of the object-to-be-measured and background noise. For example, the photodetector or the calculator multiplies the fourth emission intensity 17.7×107 (a.u.) to which the fourth light-emitting diode corresponds by the proportion relationship of 1.20 times. The resulting emission intensity may be regarded as the emission intensity of the fourth light-emitting diode at a specific junction temperature (25 degrees Celsius).

Specifically speaking, in the present invention, at least one of the light-emitting diodes, some of the light-emitting diodes, or all of the light-emitting diodes in a plurality of the light-emitting diodes of the light source is subjected to the luminescence correction method sequentially or simultaneously. Preferably, all light-emitting diodes in the present invention are subjected to the luminescence correction method at the same time. The resultant spectral energy distribution curve may be regarded as the spectral energy distribution curve at a specific junction temperature (25 degrees Celsius), and the resultant spectral signals may be regarded as the spectral signals at a specific junction temperature (25 degrees Celsius).

Figure 10:
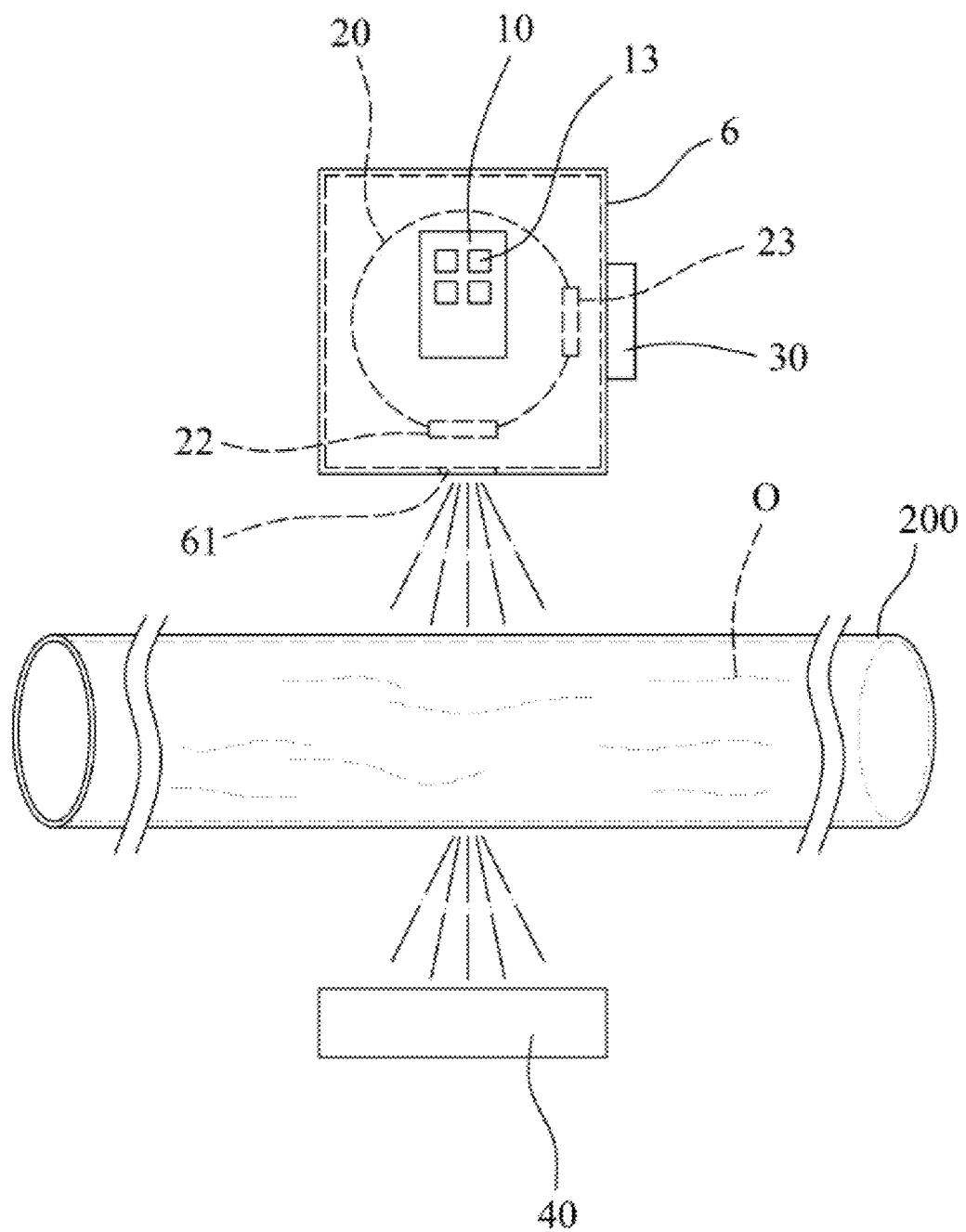
FIG. 10 is a schematic diagram of an embodiment of the optical analysis system of the present invention.

Please refer to FIG. 10. It shows an embodiment of the optical analysis system of the present invention. In addition to the optical analyzer 100 shown in FIG. 2, the optical analysis system of this embodiment further includes a liquid transport member 200. The fluid-to-be-measured O is transported in the liquid transport member 200. The uniformly mixing or light-splitting component 20 and the second optical receiver 40 are provided at two sides of the liquid transport member 200. The second light ray L2 passes through the liquid transport member 200 to form a detection light ray L3 to be received by the second optical receiver 40. Although the optical analysis system shown in FIG. 10 includes the optical analyzer 100 shown in FIG. 2, the present invention is not limited thereto. The optical analyzer shown in FIG. 4 is also applicable to the optical analysis system of the present invention.

Figure 11:
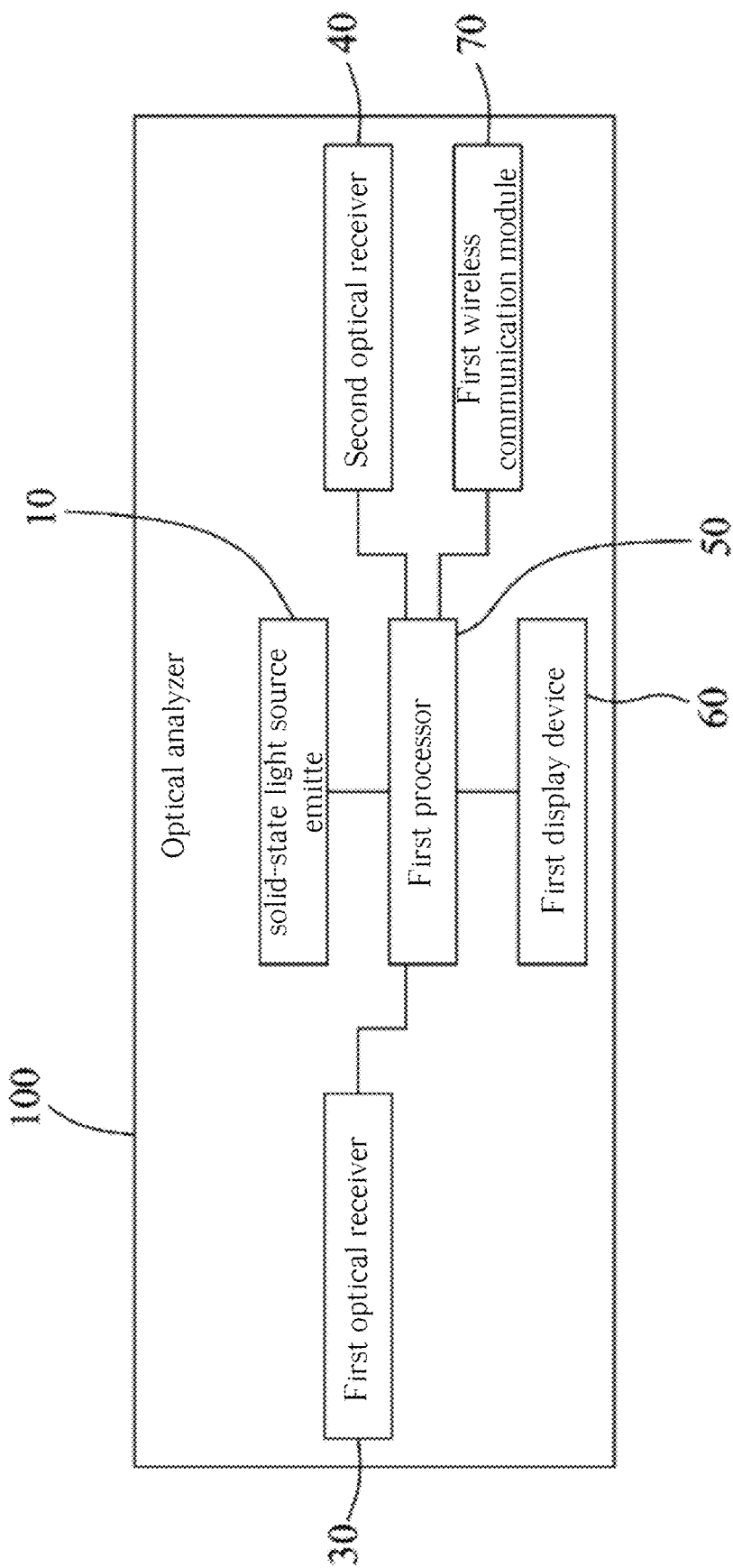
FIG. 11 is a system block diagram of an embodiment of the optical analyzer of the present invention.

Please refer to FIG. 11. It shows a system block diagram of an embodiment of the optical analyzer of the present invention. In addition to the aforementioned solid-state light source emitter 10, a uniformly mixing or light-splitting component 20, a first optical receiver 30 and a second optical receiver 40 in the optical analyzer of the present invention, the optical analyzer of this embodiment further includes a first processor 50, a first display device 60 and a first wireless communication module 70. The solid-state light source emitter 10, the first optical receiver 30 and the second optical receiver 40 are connected to the first processor 50. The first processor 50 controls the solid-state light source emitter 10 to emit a plurality of light rays in sequence. The light intensity signals received by the first optical receiver 30 and by the second optical receiver 40 are displayed on the first display device 60, that is, the first display device 60 displays the absorption spectrum of the detection light ray L3 which is generated after the second light ray L2 passes through the object-to-be-measured. The first wireless communication module 70 is connected to the first processor 50. The light intensity signals received by the first optical receiver 30 and by the second optical receiver 40 may be transmitted to an external electronic device through the first wireless communication module 70, or the first wireless communication module 70 receives control signals from external electronic devices.

Figure 12:
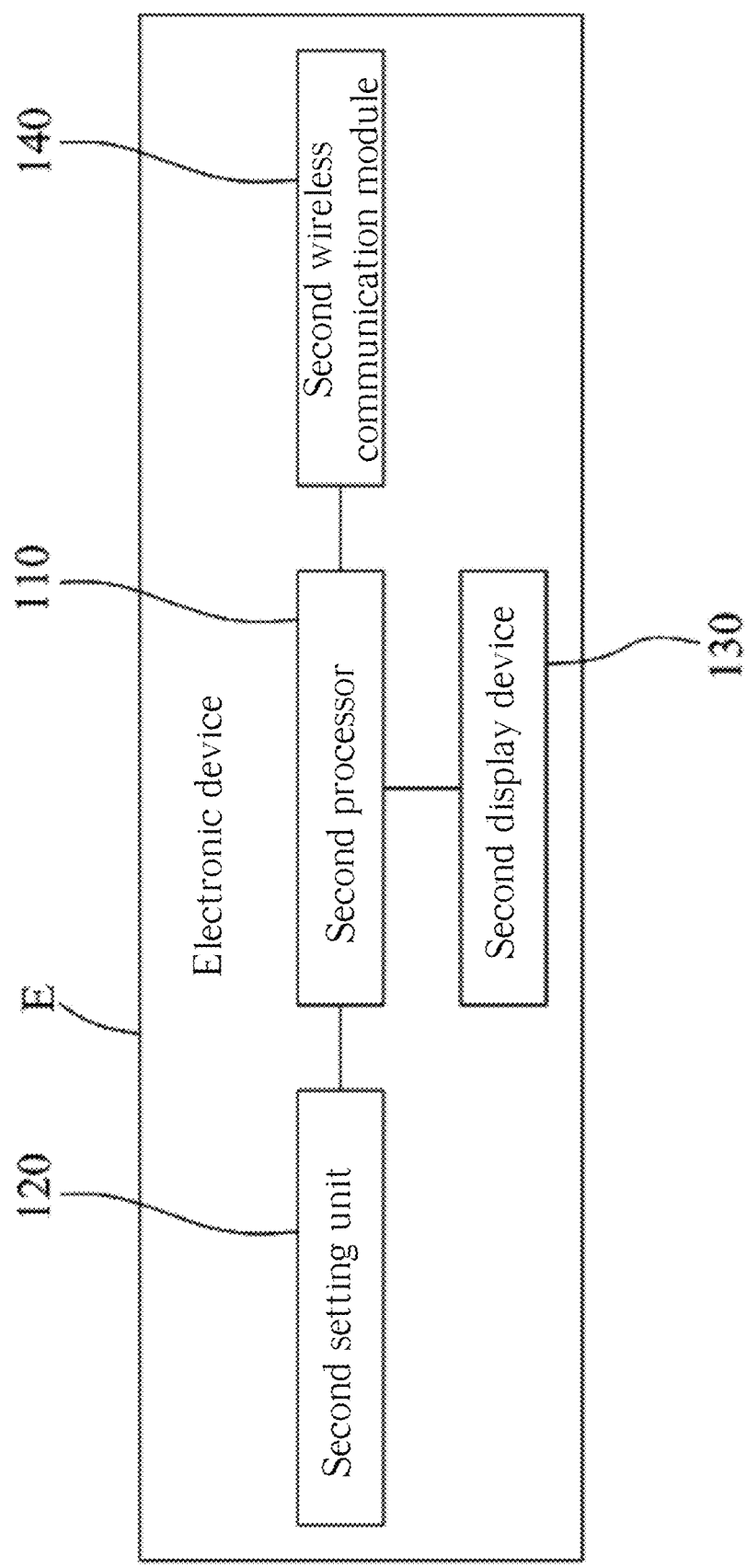

Please refer to FIG. 12. It shows a system block diagram of an electronic device to which the optical analyzer of the present invention is signal-communicatively connected. The external electronic device may be, for example, a mobile device or a computer device. The external electronic device E includes a second processor 110, a second setting unit 120, a second display device 130 and a second wireless communication module 140. The second setting unit 120, the second display device 130 and the second wireless communication module 140 are all connected to the second processor 110. The second wireless communication module 140 forms a signal connection with the first wireless communication module 70. The light intensity signals received by the first optical receiver 30 and by the second optical receiver 40 may be transmitted to the external electronic device E through the first wireless communication module 70 and the second wireless communication module 140, transmitted to the second display device 130 through the second processor 110 and displayed on the second display device 130. The setting values or instructions (control signals) input by the second setting unit 120 are also transmitted to the first wireless communication module 70 via the second processor 110 through the second wireless communication module 140, and then to the first processor 50 to control the solid state light source emitter 10.

Furthermore, in the above embodiment, an optical analyzer can be used to compare the standard transmittance ratio and the working transmittance ratio to determine the changes in the composition of the fluid-to-be-measured O according to the comparison results, wherein the optical analyzer includes a processor to carry out the above work. In other embodiments, the comparison and analysis may be carried out by a computer device or a cloud server to which the optical analyzer is electrically connected (wired or wirelessly connected).

Figure 13:
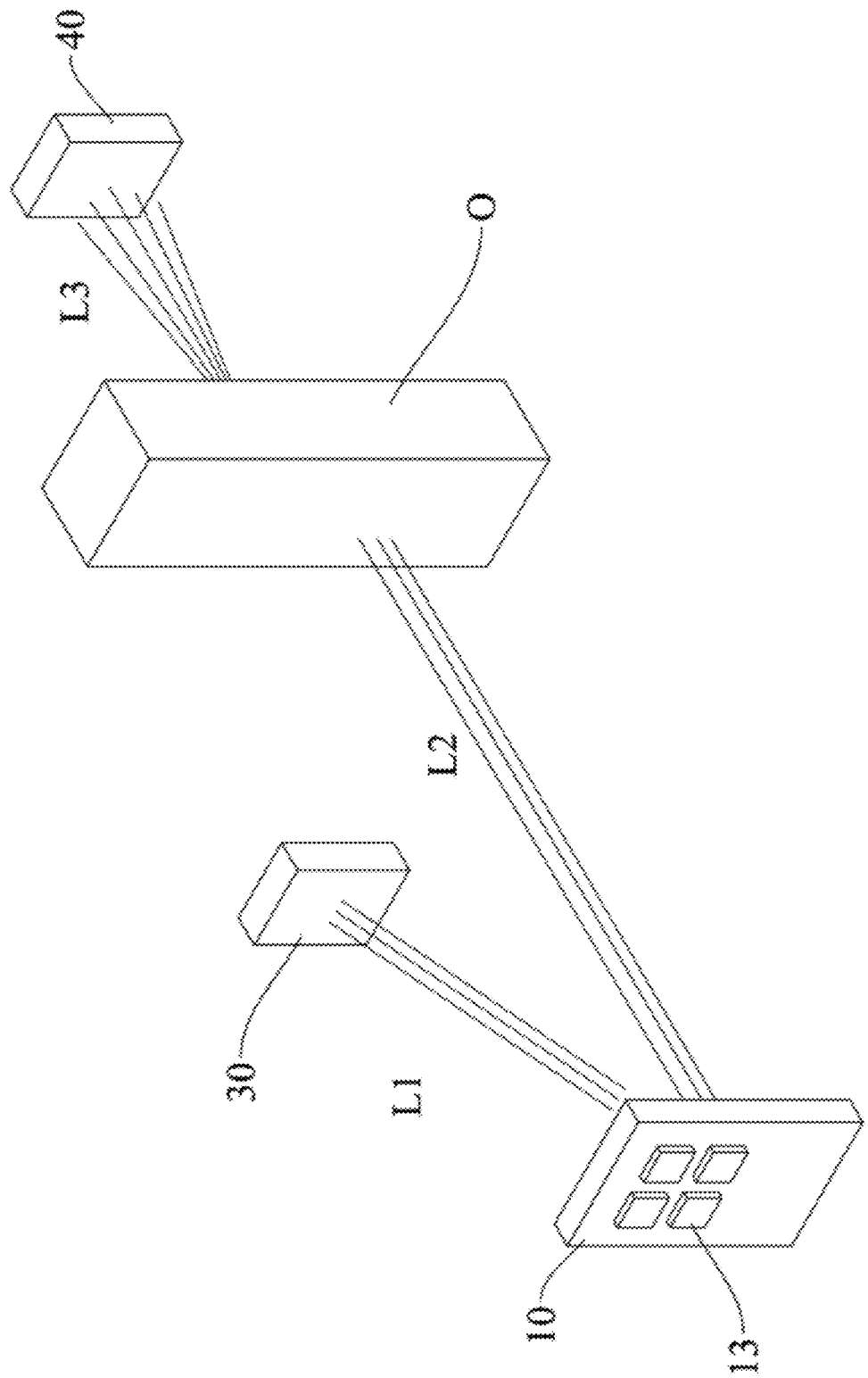
FIG. 13 is a schematic diagram of another embodiment of the optical analyzer of the present invention.

In addition, please refer to FIG. 13 of the present invention. FIG. 13 is a schematic diagram of another embodiment of the optical analyzer of the present invention. Different from what are illustrated in FIG. 5, it does not have a uniformly mixing or light-splitting component 20' (that is, it does not have a shielding plate with a through hole 24). In this embodiment, the light rays emitted by the solid-state light source emitter 10 include the first light ray L1 and the second light ray L2. The first optical receiver 30 and the second optical receiver 40 are disposed on different two sides of the fluid-to-be-measured O. The first optical receiver 30 is disposed in the traveling direction of the first light ray L1 emitted by the solid-state light source emitter 10, but not in the traveling direction of the second light ray L2 emitted by the solid-state light source emitter 10, and the second optical receiver 40 is disposed in the traveling direction of the third light L3 which is formed by the first light ray L1 passing through the fluid-to-be-measured O.

When the first light ray L1 has a standard light intensity, there is a specific ratio between the light intensity of the second light ray L2 and the standard light intensity, and the ratio of the detection light ray L3 to the standard light intensity is the standard transmittance ratio of the fluid-to-be-measured O. When the first light ray L1 has the working light intensity, the light intensity of the second light ray L2 exhibits a specific ratio to the working light intensity. The ratio of the detection light ray L3 to the working light intensity is the working transmittance ratio of the fluid-to-be-measured O, and the standard light intensity is not the same as the working light intensity. In this way, the comparison result between the standard transmittance ratio and the working transmittance ratio is used to determine the composition change of the fluid-to-be-measured O.

To sum up, compared with the current technologies and products, the present invention has at least one of the following advantages.

An objective of the present invention is to use the light source which has a plurality of light-emitting components to emit light rays of different wavelength ranges to emit light rays one by one, so that the optical analyzer does not need to be equipped with a monochromator of the prior art, so the volume of the optical analyzer can be greatly reduced. Moreover, the optical analyzer of the present invention is provided with a first optical receiver and a second optical receiver to be able to detect the attenuation state of the light intensity of the light-emitting components.

One objective of the present invention resides in the technical feature of uniformly mixing or light-splitting components as optical integrating spheres. Since the volume of the optical integrating sphere is smaller, it can be used to solve the problem of large volume and inconvenient portability caused by the use of beam splitters in the past. Furthermore, the optical integrating sphere is able to emit light rays through the specific first light exit and the second light exit after the light rays are uniformly mixed, thereby further solving the problem of the influence on light intensity caused by the changes in the angles of a beam splitter when a beam splitter is used in the past.

One objective of the present invention resides in the technical feature of using a uniformly mixing or light-splitting component as a shielding plate. Due to the through-holes of the shielding plate and its arrangement to let a portion of the light rays pass through the through hole, it may further solve the problem of the influence on light intensity caused by the changes in the angles of the beam splitter when a beam splitter is used in the past in addition to solving the problem of large volume and inconvenient portability caused by the use of a beam splitter in the past.

One objective of the present invention is to monitor in real time or dynamically continuously record whether the current transmittance ratio of the fluid-to-be-measured and its composition ratio and concentration meet the quality required for normal operation through a first optical receiver which receives the first light ray and through a second optical receiver which receives the detection light ray passing through the fluid-to-be-measured, or to further estimate the service life, and for the preparations of replacing or adjusting the fluid-to-be-measured in advance.

An objective of the present invention is to monitor in real time whether the light intensity of the light source of the solid-state light source emitter attenuates and the change values of attenuation of the light intensity signal through the first optical receiver which receives the first light ray, and to further adjust or replace the light source of the solid-state light source emitter.

However, the above are only preferred embodiments of the present invention, and they are not to limit the scope of the present invention. That is, any simple equivalent changes and modifications made in accordance with the claims and the specification of the invention are still within the scope of this invention. In addition, any one of the embodiment or the claim of the present invention does not necessarily achieve all the purposes or advantages or features which are disclosed in the present invention. In addition, the abstract section and the title are only used to assist in searching patent documents and are not to limit the scope of the invention. In addition, terms such as "first" and "second" mentioned in this specification or in the claims are only used to name elements or to distinguish between different embodiments or scopes without the intention to limit the upper limit or the lower limit on the number of elements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical analyzer comprising:
   a solid-state light source emitter comprising a light source, the light source comprising each one of a plurality of light-emitting components emitting a light with at least one peak emission wavelength and at least one wavelength range, a plurality of the light-emitting components are light-emitting diodes, vertical-cavity surface-emitting lasers or laser diodes, and a plurality of the light-emitting components are able to respectively exhibit discontinuous illumination of on-off frequencies, a plurality of the on-off frequencies are the same as each other or different from each other, or a plurality of the on-off frequencies are partially the same or partially different;
   a uniformly mixing or light-splitting component, the light which is emitted by a plurality of the light-emitting components forms a first light ray and a second light ray after passing through the uniformly mixing or light-splitting component, the second light ray passing through a fluid-to-be measured, and a portion of the second light ray which is not absorbed by the fluid-to-be measured forms a detection light ray;
   a first optical receiver to receive the first light ray; and
   a second optical receiver to receive the detection light ray.

2. The optical analyzer of claim 1, wherein when the first light ray has a standard light intensity, a light intensity of the second light ray has a specific ratio to the standard light intensity, and a ratio of the detection light ray to the standard light intensity is a standard transmittance ratio of the fluid-to-be measured; and when the first light ray has a working light intensity, the light intensity of the second light ray and the working light intensity exhibits the specific ratio, and a ratio of the detection light ray to the working light intensity is a working transmittance ratio of the fluid-to-be measured, and the standard light intensity and the working light intensity are different; wherein a comparison result between the standard transmittance ratio and the working transmittance ratio is used to determine a composition change of the fluid-to-be measured.

3. The optical analyzer of claim 1, wherein when the first light ray has a standard light intensity, the first optical receiver receives the first light ray to generate a standard light intensity signal, and when the first light ray has an attenuated light intensity, the first optical receiver receives the first light ray to generate an attenuated light intensity signal, to compare the standard light intensity signal and the attenuated light intensity signal to obtain a change value to adjust a light intensity of the first light ray according to the change value to obtain a measurement system with the light intensity in a constant range.

4. The optical analyzer according to claim 1, wherein the uniformly mixing or light-splitting component is an optical integrating sphere, and the optical integrating sphere comprises a light entrance, a first light exit and a second light exit, the first optical receiver aligns with the first light exit, and the second optical receiver aligns with the second light exit, the light ray emitted by the light-emitting components enters the optical integrating sphere through the light entrance, the first light ray emits from the first light exit, and the second light ray emits from the second light exit.

5. The optical analyzer according to claim 4, wherein the first light exit and the light entrance are separated by a center angle of 90 degrees of the circle relative to the center of the optical integrating sphere, the second light exit and the light entrance are separated by a center angle of 90 degrees of the circle relative to the center of the optical integrating sphere, and the first light exit and the second light exit are separated by a center angle of 180 degrees of the circle relative to the center of the optical integrating sphere.

6. The optical analyzer of claim 1, wherein the uniformly mixing or light-splitting component is a shielding plate with a through hole, the first optical receiver is provided at the shielding plate to face a plurality of the light-emitting components, a portion of a plurality of the light rays emitted by a plurality of the light-emitting components becomes the first light ray to be received by the first optical receiver, and another portion of a plurality of the light rays emitted by a plurality of the light-emitting components passes through the through hole to become the second light ray.

7. The optical analyzer according to claim 1, wherein a plurality of the wavelength ranges of two of the light-emitting components to which adjacent two of the peak emission wavelengths correspond partially overlap to form a continuous wavelength range which is wider than the wavelength range in each of a plurality of the light-emitting components, or a plurality of the wavelength ranges of two of the light-emitting components to which adjacent two of the peak emission wavelengths correspond do not overlap.

8. The optical analyzer of claim 1, wherein a plurality of the light-emitting elements emit the light sequentially, and that emit the light sequentially refers to a plurality of the light-emitting elements which emit the light of the same wavelength range at different positions do not emit the light at the same time; or a plurality of the light-emitting elements partially emit the light at the same time, that partially emit the light at the same time refers to a plurality of the light-emitting elements in which a portion emits at the same time and emits the light of different the wavelength ranges at the same time.

9. The optical analyzer of claim 1, wherein the solid-state light source emitter further comprises a substrate to measure a constant current bias when a plurality of the light-emitting components operate, and a PN junction temperature of the solid-state light source emitter is obtained by a mathematical relationship formula or a corresponding table or diagram between the constant current bias of a plurality of the light-emitting components and the PN junction temperature of the solid-state light source emitter, then an emission intensity ratio of a plurality of the light-emitting components is obtained by a mathematical relationship formula or a corresponding table or diagram between a light intensity of a plurality of the light-emitting components and the PN junction temperature to correct a light intensity value emitted by a plurality of the light-emitting components which is measured by the first optical receiver according to a determined result.

10. The optical analyzer of claim 1, further comprising a first processor and a first display device, the solid-state light source emitter, the first optical receiver and the second optical receiver are connected to the first processor, the first processor controls the solid-state light source emitter to sequentially emit a plurality of the light rays, the light intensity signals received by the first optical receiver and by the second optical receiver are displayed on the first display device.

11. The optical analyzer of claim 10, further comprising a first wireless communication module connected to the first processor, the light intensity signals received by the optical receiver and by the second optical receiver are able to be transmitted to an external electronic device via the first wireless communication module, or the first wireless communication module receives a control signal from the external electronic device.

12. The optical analyzer of claim 1, wherein the on-off frequencies are between 0.05 time/second and 50,000 times/second.

13. The optical analyzer of claim 12, wherein a time interval for turning on the light-emitting component in the on-off frequencies is between 0.00001 second and 10 seconds, and a time interval for turning off the light-emitting component in the on-off frequencies is between 0.00001 seconds and 10 seconds.

14. The optical analyzer of claim 1, wherein a difference between adjacent two of the peak emission wavelengths is between 1 nm and 80 nm.

15. The optical analyzer of claim 14, wherein the difference between adjacent two of the peak emission wavelengths is between 5 nm and 80 nm.

16. The optical analyzer of claim 15, wherein a full width at half maximum to which each the peak emission wavelength corresponds is between 15 nm and 50 nm.

17. The optical analyzer of claim 16, wherein the full width at half maximum to which each the peak emission wavelength corresponds is between 15 nm and 40 nm.

18. The optical analyzer of claim 1, wherein a difference between adjacent two of the peak emission wavelengths is greater than or equal to 0.5 nm.

19. The optical analyzer of claim 18, wherein the difference between adjacent two of the peak emission wavelengths is between 1 nm and 80 nm.

20. The optical analyzer of claim 1, wherein a full width at half maximum to which at least a portion of the peak emission wavelength in a plurality of the peak emission wavelengths corresponds is greater than 0 nm and less than or equal to 60 nm.

21. An optical analyzer, comprising:
a solid-state light source emitter comprising a light source, the light source comprising each one of a plurality of light-emitting components emitting a light with at least one peak emission wavelength and at least one wavelength range, a plurality of the light-emitting components are light-emitting diodes, vertical-cavity surface-emitting lasers or laser diodes, and a plurality of the light-emitting components are able to respectively exhibit discontinuous illumination of on-off frequencies, a plurality of the on-off frequencies are the same as each other or different from each other, or a plurality of the on-off frequencies are partially the same or partially different, and the light which is emitted by a plurality of the light-emitting components forms a first light ray and a second light ray, the second light ray forms a detection light ray after passing through a fluid-to-be measured;
a first optical receiver to receive the first light ray; and
a second optical receiver to receive the detection light ray;
wherein when the first light ray has a standard light intensity, a light intensity of the second light ray has a specific ratio to the standard light intensity, and a ratio of the detection light ray to the standard light intensity is a standard transmittance ratio of the fluid-to-be measured; and when the first light ray has a working light intensity, a light intensity of the second light ray and the working light intensity exhibits the specific ratio, and a ratio of the detection light ray to the working light intensity is a working transmittance ratio of the fluid-to-be measured, and the standard light intensity and the working light intensity are different; wherein a comparison result between the standard transmittance ratio and the working transmittance ratio is used to determine a composition change of the fluid-to-be measured.

22. An optical analysis system, comprising:

the optical analyzer according to claim 1; and a liquid transport component, the fluid-to-be measured transported in the liquid transport member, the uniformly mixing or light-splitting component and the second optical receiver provided on two sides of the liquid transport member, the second light ray passing through the liquid transport member to form the detection light ray to be received by the second optical receiver.

\* \* \* \* \*